US012567059B2

(12) United States Patent　　　　(10) Patent No.:　US 12,567,059 B2

Kamal et al.　　　　　　　　　(45) Date of Patent:　　　Mar. 3, 2026

---

(54) SYSTEM AND METHOD FOR MANAGING THREATS IN OPEN TRANSACTION NETWORKS

(71) Applicant: PAYPAL, INC., San Jose, CA (US)

(72) Inventors: Ashraf Kamal, New Delhi (IN); Padmapriya Mohankumar, Chennai (IN); Vishal Kumar Singh, Howrah (IN)

(73) Assignee: PayPal, Inc., San Jose, CA (US)

( * ) Notice: Subject to any disclaimer, the term of this patent is extended or adjusted under 35 U.S.C. 154(b) by 93 days.

(21) Appl. No.: 18/732,277

(22) Filed: Jun. 3, 2024

(65) Prior Publication Data

US 2025/0371528 A1　　Dec. 4, 2025

(51) Int. Cl.
G06Q 20/38　　　　(2012.01)

(52) U.S. Cl.
CPC .................................. G06Q 20/382 (2013.01)

(58) Field of Classification Search
CPC ...... G06F 21/50; H04L 63/14; H04L 63/1408
USPC ........................................................ 726/22
See application file for complete search history.

(56) References Cited

U.S. PATENT DOCUMENTS

| | | | | |
|---|---|---|---|---|
| 10,498,747 B1 * | 12/2019 | Meaney | ................... | H04L 63/20 |
| 2013/0276125 A1 * | 10/2013 | Bailey | ..................... | G06F 21/46 |
| | | | | 726/25 |

| | | | | |
|---|---|---|---|---|
| 2014/0317751 A1 * | 10/2014 | Bailey | ................. | H04L 63/1433 |
| | | | | 726/25 |
| 2020/0211022 A1 * | 7/2020 | Allbright | ............ | H04L 63/1408 |
| 2021/0209567 A1 * | 7/2021 | Jing | ..................... | G06Q 20/102 |
| 2023/0137734 A1 * | 5/2023 | Afzal | ................. | H04L 63/1416 |
| | | | | 726/22 |

OTHER PUBLICATIONS

"6 Reasons for Banks to Embrace Open Banking," https://nordicapis.com/6-reasons-for-banks-to-embrace-open-banking/, Feb. 2020, 10 pp.
"Customer Data Access and Fintech Entry: early Evidence From Open Banking," Bank of England, Feb. 2024, https://www.bankofengland.co.uk/-/media/boe/files/working-paper/2024/customer-data-access-and-fintech-entry-early-evidencefrom-open-banking.pdf, 105 pp.

(Continued)

*Primary Examiner* — Teshome Hailu

(74) *Attorney, Agent, or Firm* — Greenberg Traurig, LLP

(57)　　　　　　ABSTRACT

Systems and methods for managing threats in a network including applying, at a first layer, a first request obtained from a first computing device to a first graph to determine one or more first embeddings and one or more second embeddings, classifying, at a second layer, a second request obtained from a second computing device as a first request type or a second request type based on applying the second request to a second graph, predicting, at a third layer, an authenticity of a call sequence obtained from the second computing device based on a sequence threshold, and sending the call sequence to a third computing device based on authenticating the call sequence. The first request is a transaction to be performed by the second computing device and the second request is a second processing transaction to be performed by the third computing device based on the first request.

18 Claims, 17 Drawing Sheets

(56) References Cited

OTHER PUBLICATIONS

"Exploring the Benefits and Pitfalls of Open Banking," ASLI RI, Dec. 2022, https://asliri.id/blog/exploring-the-benefits-and-pitfalls-of-open-banking/, 9 pp.

"Open Banking Will Grow The Whole Economy Not Only Fintech," Nov. 2023, https://www.forbes.com/sites/davidbirch/2023/11/24/open-banking-will-grow-the-whole-economy-not-onlyfintech/?sh=4a9c92ad6588, 6 pp.

"Open Banking's Contributions to Authorization Rates: Common Hurdles and Benefits for Businesses," PayPal Newsroom Jun. 2021, https://newsroom.paypal-corp.com/2021-06-09-Open-Bankings-Contributions-to-Authorization-Rates, 5 pp.

"What is Open Banking & How Does it Work?" Razorpay, Apr. 2023, https://razorpay.com/blog/business-banking/open-banking/#Risks_of_Open_Banking, 10 pp.

Sanjeev Kumar, Demystifying Fintech, LinkedIn, https://www.linkedin.com/posts/sanjeev-fintech_customer-data-access-and-fintech-entry-open-activity-7163461660655955968-4EtX, 20 pp.

* cited by examiner

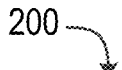

200

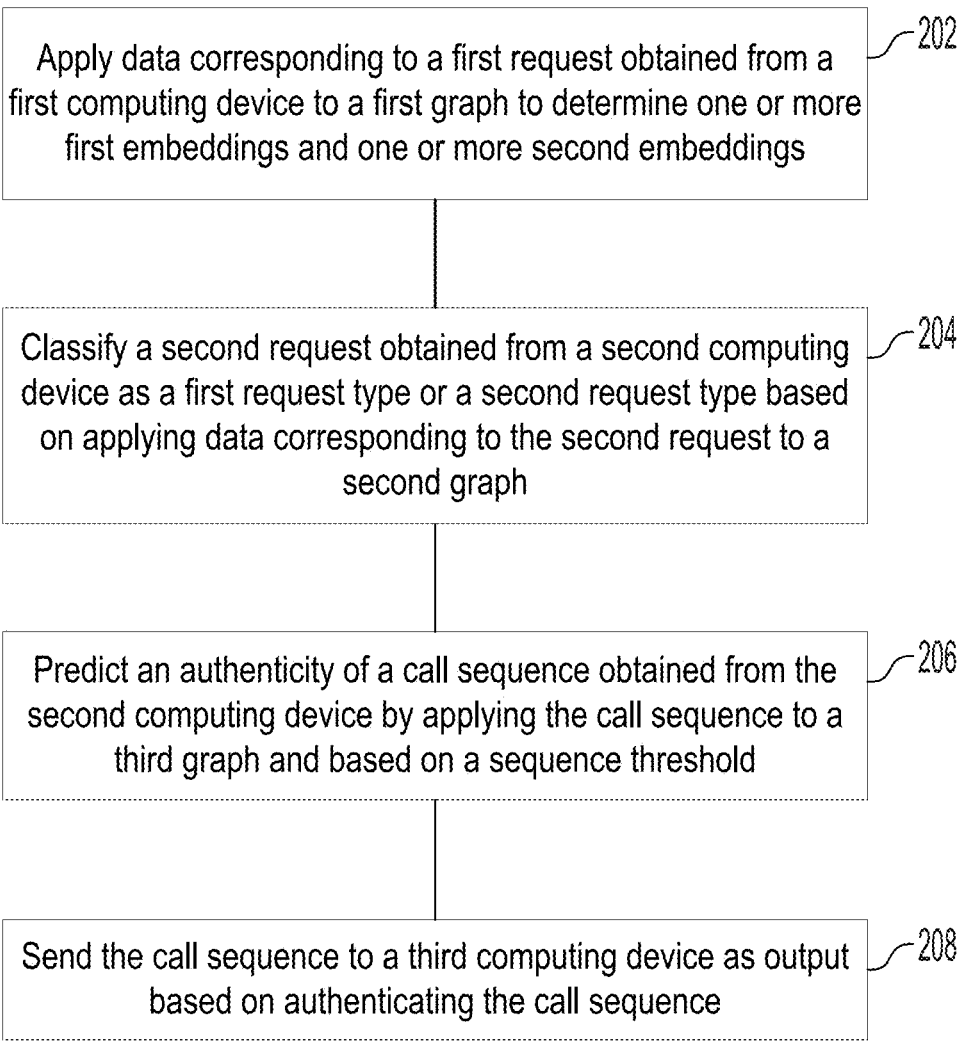

Apply data corresponding to a first request obtained from a first computing device to a first graph to determine one or more first embeddings and one or more second embeddings ⌐202

Classify a second request obtained from a second computing device as a first request type or a second request type based on applying data corresponding to the second request to a second graph ⌐204

Predict an authenticity of a call sequence obtained from the second computing device by applying the call sequence to a third graph and based on a sequence threshold ⌐206

Send the call sequence to a third computing device as output based on authenticating the call sequence ⌐208

Obtain the first request from the first computing device

304

Extract the first graph from a global graph

306

Send the one or more first embeddings and the one or more second embeddings to the second computing device

500

502

Obtain a global data corresponding to user data from a plurality of first computing devices

506

Determine the global graph based on classifying the global data

600

602

Allocate nodes representative of the global data to respective embedding spaces in the global graph

604

Classify the global data as the first data type or the second data type

606

Partition the nodes into a plurality of clusters based on classifying the global data as one of the first data type and the second data type

700

702

Obtain a source dataset corresponding to a plurality of requests from the third computing device

704

Encode the source dataset into respective embedding spaces based on applying the source dataset to a second neural network model

706

Partition the source dataset in the respective embedding spaces into respective clusters of a second set of clusters

900

Obtain a target dataset from a fourth computing device          902

Encode the target dataset into respective embedding spaces of the second graph          902

Tune the second graph based on the encoded target dataset          904

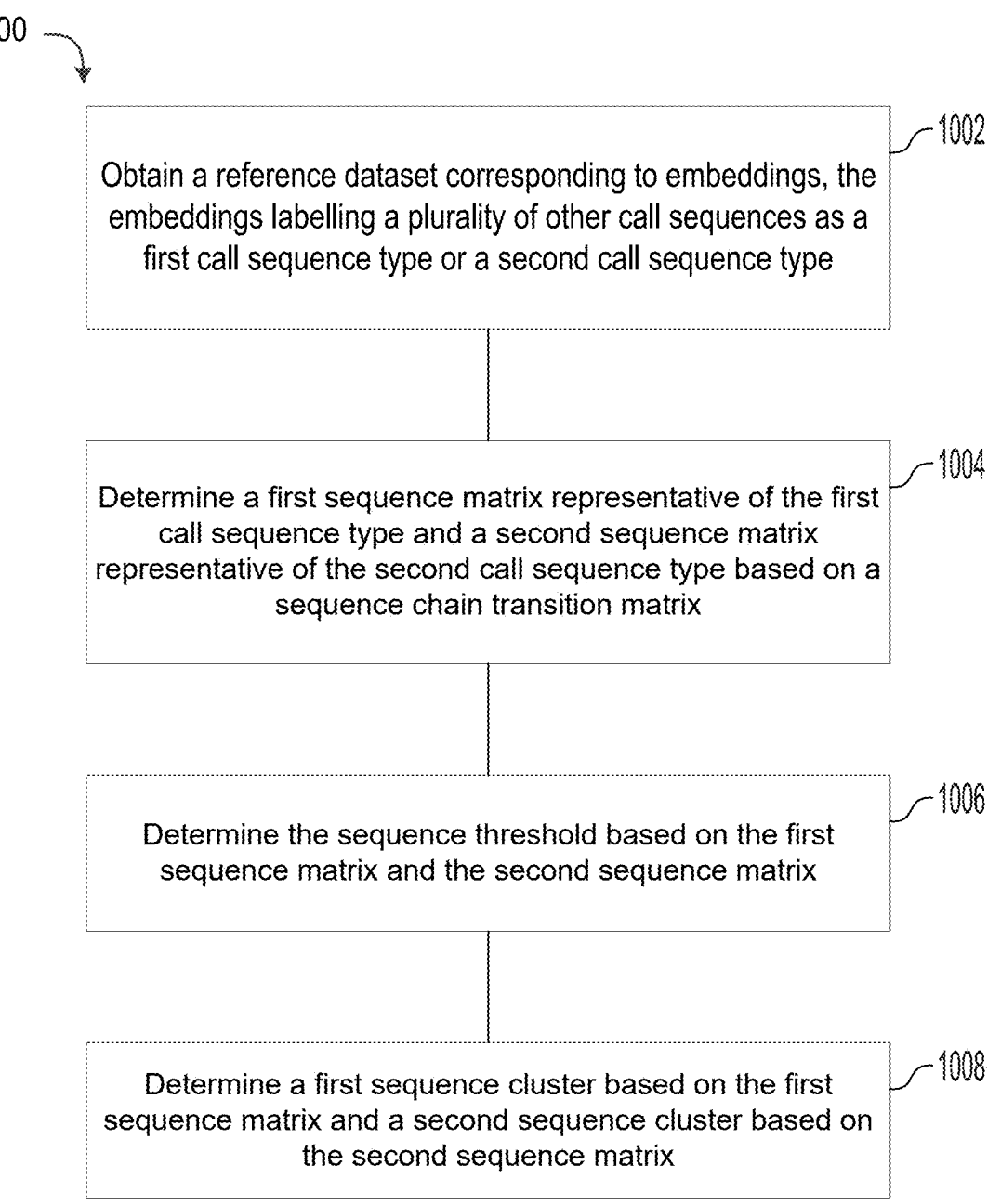

1000

Obtain a reference dataset corresponding to embeddings, the embeddings labelling a plurality of other call sequences as a first call sequence type or a second call sequence type ⌐1002

Determine a first sequence matrix representative of the first call sequence type and a second sequence matrix representative of the second call sequence type based on a sequence chain transition matrix ⌐1004

Determine the sequence threshold based on the first sequence matrix and the second sequence matrix ⌐1006

Determine a first sequence cluster based on the first sequence matrix and a second sequence cluster based on the second sequence matrix ⌐1008

*FIG. 11*

SYSTEM AND METHOD FOR MANAGING THREATS IN OPEN TRANSACTION NETWORKS

FIELD

The present disclosure relates to the field of network architectures. More particularly, to systems and methods for managing threats in open network architectures.

BACKGROUND

Computing network technology is commonly utilized to facilitate performing secured online transactions between entities. For example, a user can send a request to an entity to fulfill a secured online transaction to a third-party for goods and services of the third-party. The requests, and the fulfillment thereof, can include sending and receiving data including sensitive data between an authorized user and one or more entities, which is an attractive target for unauthorized users seeking to engage in malicious activity and can therefore pose a threat to the network. For example, these threats can include, but is not limited to, gaining unauthorized access of the network, gaining access to sensitive data, and performing unauthorized online transactions while posing as an authorized user.

BRIEF DESCRIPTION OF THE DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

FIG. 3 is a flow diagram illustrating an example method of performing the threat management in an open transaction network, according to some embodiments.

FIG. 11 is a flow diagram of a method for predicting the authenticity of the call sequence obtained from the second computing device based on the sequence threshold, according to some embodiments.

DETAILED DESCRIPTION

Figure 1:
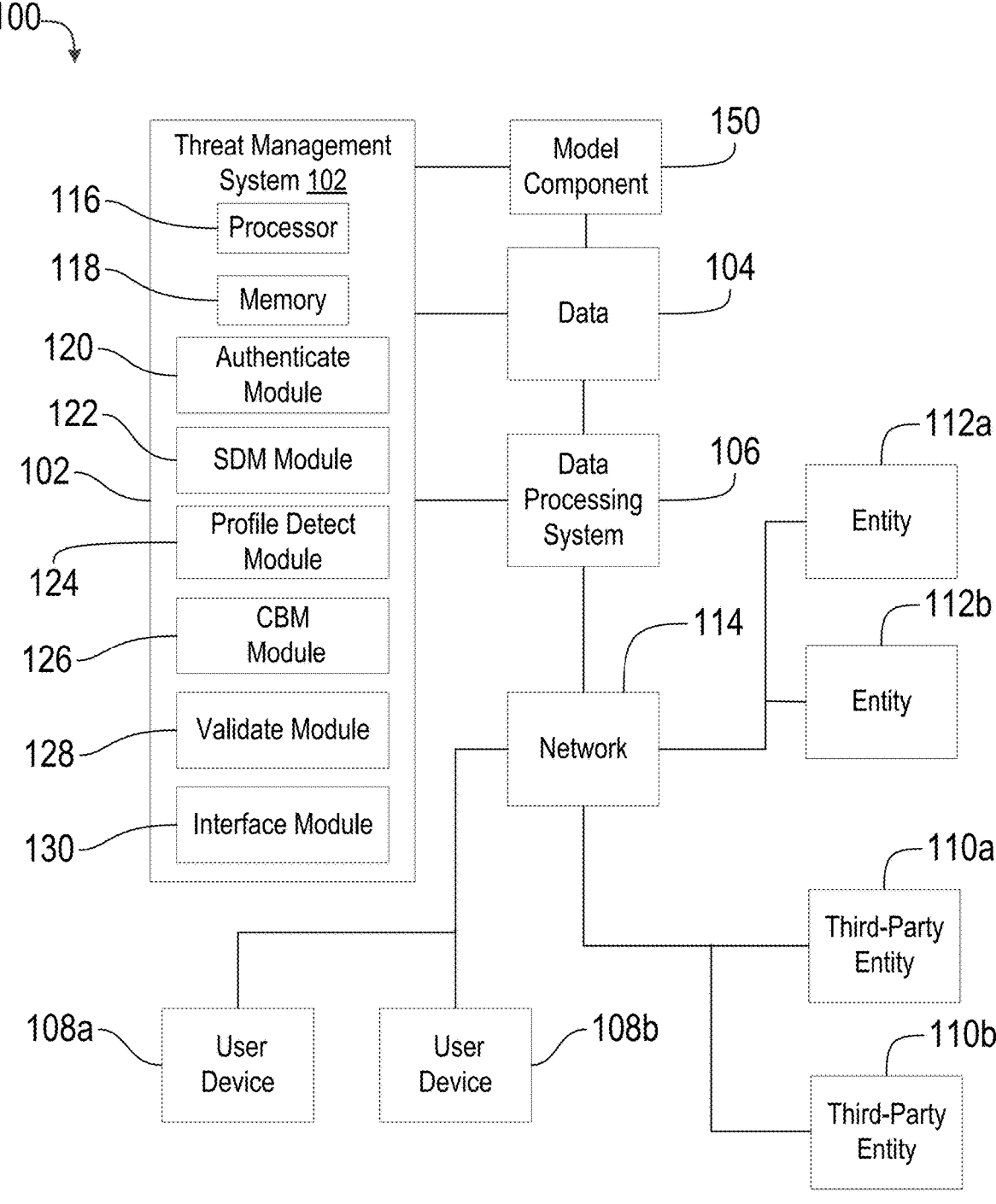
FIG. 1 is a block diagram illustrating an example networked system for performing the threat management, according to some embodiments.

Computing devices can be in electronic communication with a networked system of an entity and can utilize the networked system to perform various electronic activities. These activities can include, but is not limited to, performing electronic transactions with other computing devices on the network. These other computing devices can include, for example, computing devices of the entity, computing devices associated with other entities in electronic communication with the network, and the like. The types of electronic transactions can include, for example, exchange of information, processing requests, sale or purchase of goods or services, financial activities, other processing operations, or any combinations thereof.

Fulfillment of electronic transactions can include sending and receiving a sequence of transaction requests using the network of the entity that flow from a computing device associated with a user initiating the transaction request to one or more other computing devices associated with one or more other entities performing electronic transactions on the network. In some embodiments, the electronic transactions can be sent using an application programming interface ("API"). In some embodiments, the transaction requests can include therein sensitive user data, non-sensitive user data, or both. The sensitive data can include, but is not limited to, location data, device data, account data, interaction data, user behavior data, financial data, user's personal information, other types of data, or any combinations thereof.

Various embodiments of the present disclosure relate to systems, devices, networks, and methods relating to providing end-to-end threat management security in an open transaction network at one or more layers. Users performing electronic transactions on the network with computing devices or networked systems of other entities typically have accounts established with the other entities on their respective networked systems. Users can utilize the open transaction network to share user data and services from these entities with third parties. The third parties can utilize the user data and services from these entities to provide one or more goods or services to the user. In the open transaction network, the user device, the third-party device, and the entity device can operate at one or more respective layers.

The open transaction network can provide the threat management between these one or more respective layers. In some embodiments, the user device, the third-party device, and the entity device can operate at one or more respective application layers. In some embodiments, the open transaction network can provide the threat management at one or more respective presentation layers located between the respective application layers.

The embodiments of the present disclosure provide end-to-end network security from potential threats by providing a scalable threat management system and framework. Malicious actors can seek to exploit vulnerabilities in open transaction networks for malicious purposes or personal gain. For example, a malicious actor can pose as a user and initiate one or more electronic transactions and transfer electronic funds from the user's account with an entity to an account of the malicious actor with another entity on the open transaction network. In another example, fraudulent electronic transactions on the open transaction network by a malicious actor can result in financial harm and/or damage in reputation to the user or the one or more other entities. In this regard, as new or different vulnerabilities are identified, the functional modules can be trained to account for these new vulnerabilities or new functional modules can be dynamically added to the threat management system. The one or more functional modules of the threat management system can be implemented at the respective layers. For example, in some embodiments, the embodiments can be executed at edge devices in the computing network.

The threat management system provides a computationally efficient solution for providing security from potential security threats by implementing the one or more functional modules at the respective layers between the computing devices performing the electronic transactions on the network. In addition, the threat management system is capable of continuously evaluating potential threats in the open transaction network in real-time without necessitating human intervention to identify potential threats.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

FIG. 1 is a block diagram illustrating an example networked system 100 for performing the threat management, according to some embodiments.

The system 100 can include a threat management system 102, a source of datastore 104, a transaction processing system 106, a plurality of user devices 108 (two such user devices 108a, 108b are shown), a plurality of third-party entity devices 110 (two such third-party entity devices 110a, 110b are shown), and a plurality of entity devices 112 (two such entity devices 112a, 112b are shown). The user devices 108, third-party entity devices 110, entity devices 112, or any combinations thereof, may be in electronic communication with transaction processing system 106 over network 114 to perform the electronic transactions. In some embodiments, the user devices 108, third-party entity devices 110, and entity devices 112 may be associated with respective other entities and may utilize system 100 to perform the electronic transactions. In other embodiments, the system 100 may include one or more of the user devices 108, third-party entity devices 110, entity devices 112, or any combinations thereof. For example, system 100 includes entity device 112a (i.e., of the same entity) and entity device 112b can be associated with an external entity, and the user devices 108 and third-party entity devices 110 can perform the electronic transactions with entity device 112a and entity device 112b on the network 114. The user devices 108, third-party entity devices 110, entity devices 112, or any combinations thereof, may be in electronic communication with each other over network 114. The threat management system 102, datastore 104, transaction processing system 106, or any combinations thereof, can also be in electronic communication with each other via the network 114, other networks, or any combinations thereof.

It is to be appreciated by those having ordinary skill in the art that the system 100 is scalable and that the number of user devices 108, third-party entity devices 110, and entity devices 112 performing electronic transactions in system 100 is not intended to be limiting and may include any number of respective devices performing any number of electronic transactions. For example, millions, tens of millions, hundreds of millions, or more respective devices can be performing electronic transactions in system 100.

The threat management system 102 can include a processor 116 and a non-transitory computer readable memory 118 that contains instructions that, when executed by the processor, cause the threat management system 102 to perform one or more steps, processes, methods, operations, etc. described herein with respect to the threat management system 102. The threat management system 102 may include one or more functional modules embodied in the memory. The functional modules may include a multi-lingual authentication module 120, a sensitive data minimization ("SDM") module 122, a profile detection module 124, a cross-border data monitoring ("CDM") module 126, a transaction monitor module 128, and an interface module 130.

The present disclosure refers to accounts, users, transactions, and other electronic activity. Such accounts may be accounts common to a particular online service provider, a particular network, a particular electronic activity processor, etc. For example, the accounts may be accounts of transaction processing system 106, and the users may be authorized (e.g., legitimate) users associated with the accounts. The electronic transactions and other activity may be transactions processed by, or other activity in or through, transaction processing system 106. Although the present disclosure refers to electronic transactions as context for the novel methods and systems, it should be understood that such methods and systems may be applied to or in the context of a wide variety of computing actions, some of which may not be considered transactions. For example, such computing actions can be a user of user device 108 attempting to access their account at third-party entity device 110, in a network of third-party entity device 110, at entity device 112, in a network of entity device 112, in network 114, or any combinations thereof.

The multi-lingual authentication module 120 can receive, as input, transaction data corresponding to a request for performing an electronic transaction from user device 108 to third-party entity device 110. The multi-lingual authentication module 120 can predict whether a user associated with the request from the user device 108 is a legitimate user based on the transaction data. The multi-lingual authentication module 120 can make the prediction by identifying one or more languages from text in the transaction data of the request and obtained from the user device 108, performing a morphological and semantic analysis of one or more words in the request to determine a logical semantic of text or parts of the text in the request, and determining a co-relation between the one or more languages to then make the prediction of whether the user of user device 108 and sending the request to the third-party entity device 110 is a legitimate user or an unauthorized user.

The SDM module 122 can be configured to extract a local sub-graph by applying local data from user device 108 to a global graph. The SDM module 122 can, based on applying the transaction data to the local sub-graph, extract one or more embeddings from the transaction data.

The embeddings can include a first embedding, a second embedding, or both. In some embodiments, the first embedding corresponds to non-sensitive user data. In some embodiments, the embeddings can include one or more first embeddings. In some embodiments, the second embeddings correspond to sensitive data. In some embodiments, the embeddings can include one or more second embeddings. In some embodiments, the SDM module 122 can encrypt the second embeddings. In other embodiments, the SDM module 122 can tokenize the second embeddings. The SDM module 122 can further encrypt/tokenize the second embeddings to protect sensitive data from being accessed without a corresponding reference, token, key, algorithm, formula, passcode, and the like. As used herein, the term "encrypt" refers to a process of protecting data or information by using algorithms to scramble data in such a way that ideally only parties having the key can unscramble the data. As used herein, the term "tokenization" refers to a process of replacing or transforming data with a surrogate value or "token" so as to eliminate a need to send the untokenized data outside a system.

The profile detection module 124 can be configured to distinguish between an authentic user profile and a cloned profile associated with a transaction request based on determining one or more similarities between attributes from the respective profile data from the two profiles. In some embodiments, the profile detection module 124 can be configured to distinguish between an authentic user profile and one or more unauthorized cloned profiles.

The user of user device 108 can have an authentic account profile in the computing network associated with the third-party entity device 110. In some embodiments, a malicious actor can access, or attempt to access, the user's account located in the computing network of third-party entity device 110 to engage in malicious activity. In some embodiments, the unauthorized user can utilize a cloned profile to gain access to the user's account on the network of the third-party entity device 110 for engaging in the malicious activity including obtaining user data, generating fraudulent electronic transaction requests, and other fraudulent activity.

The profile detection module 124 can be configured to identify one or more attributes from the profile data associated with the respective different user profiles (e.g., authentic profile and cloned profile). The attributes can include one or more first attributes. For example, the attributes can include friends count, followers count, like score, group score, or any combinations thereof. The profile detection module 124 may determine the similarity based on an intention score of the profile requesting the transaction. The attributes can include one or more second attributes. The second attributes can include, for example, a confidence, positivity, frustration, worry, and other emotional attributes associated with the respective profiles. The attributes can include one or more third attributes. The third attributes can include, for example, social withdrawal, distractibility, stress tolerance, and other sentiment attributes may be included and used.

The profile detection module 124 can be configured to compare the attributes determined from the two profiles (e.g., authentic profile and cloned profile) and applying one or more similarity algorithms to the attributes of the respective profiles and classifying if the user profile associated with the user request is an authentic profile or a cloned profile.

The threat management system 102 can include the cross-border data monitoring (CBM) module 126. In some embodiments, based on a transaction request from a user device 108 to a third-party entity device 110, the third-party entity device 110 can send a second transaction to one or more entity devices 112 on the open transaction network. For example, the user associated with user device 108 and providing the first request can have an account on a network of entity device 112a (e.g., a first entity) and the transaction request can be for transferring electronic funds from the user's account to another account on a network of entity device 112b (e.g., a second entity).

In some embodiments, transaction requests on the open transaction network can include cross-border transaction requests between entity devices 112 located in different respective jurisdictions. That is, in some embodiments, the transaction request obtained from the third-party entity device 110 can be for performing an electronic transaction between, for example, entity device 112a and entity device 112b. In some embodiments, the transaction request can be a cross-border transaction request, and the entity device 112a can be in one jurisdiction and the entity device 112b can be in another jurisdiction different from the jurisdiction of the entity device 112a. For example, the transaction request can be an authentic electronic transaction for transferring electronic funds from a user account on a network of a first entity and to an account of the user or an account of another user on a network of the second entity.

Cross-border transactions can oftentimes be fraudulent transactions initiated by malicious actors on the open transaction network. In some embodiments, the malicious actor may initiate or cause the third-party entity device 110 to send the fraudulent transaction request to, for example, entity device 112a and entity device 112b to trigger an electronic transaction therebetween. For example, the fraudulent transaction request can be to transfer funds from a compromised user's account on a network of the first entity of entity device 112a and to a malicious actor's account on a network of the second entity of entity device 112b.

In some embodiments, the transaction request can be for performing an electronic transaction between a source end or source entity and a target end or target entity. In some embodiments, the source end can include a source country, source entity, source transaction(s), and source customer. In other embodiments, the source end can consist of a source country, source entity, source transaction(s), and a source customer. In some embodiments, the target end can include a target country, target entity, target transaction(s), and target customer. In other embodiments, the target end can consist of a target country, target entity, target transaction(s), and target customer.

The CBM module 126 can be configured to receive the cross-border transaction request from a third-party entity device 110 requesting a cross-border transaction between two entities. For example, the cross-border transaction request can be for an electronic transaction between entity device 112a associated with a first entity and entity device 112*b* associated with a second entity. In some embodiments, the cross-border transaction request can be a second request generated by the third-party entity device 110 based on a first transaction request from user device 108.

The CBM module 126 can be configured to, based on the data of the transaction request, or a portion thereof, classify a request type of the transaction request by applying the data corresponding to the transaction request to a second neural network model. In some embodiments, based on applying the data corresponding to the request type to the model, the CBM module 126 can encode the data corresponding to the transaction request into respective embeddings, allocate the embeddings into respective embedding spaces of a graph as nodes, partition the nodes of the graph into clusters, and classify the request type of the transaction request based on the grouping of the nodes representative of the transaction request into a respective cluster, the respective cluster being representative of the request type.

In some embodiments, the cross-border transaction request can be one of a first request type and a second request type. In some embodiments, the first request type can be a fraudulent request and the second request type can be an authentic (i.e., non-fraudulent) request.

In some embodiments, the CBM module 126 can train the neural network model using training data to enable classifying the request type of the cross-border transactions. In some embodiments, the neural network model can be a supervised contrastive learning model, which can utilize labeled data to train the model to differentiate between different data points and thereby enable the model to generate representation spaces where similar instances can be located closer together in a representation space, while dissimilar instances can be spaced further apart. In some embodiments, training the neural network model can include training an encoder to translate input data into dimensional feature vector representations. For example, the encoder may apply one or more encoder algorithms to translate the data of the transaction request into 2048-dimensional feature vectors.

The neural network model can include a probability distribution layer configured to output a respective vector value corresponding to a probability distribution of the inputs. In some embodiments, the neural network model can include a SoftMax layer. In some embodiments, the SoftMax layer can apply a function to the input embeddings to convert a vector of K real numbers into a probability of distributions of K probabilities proportional to the exponentials of the input numbers. In some embodiments, the SoftMax layer can apply the SoftMax function to the input vectors and then normalize the output values. In some embodiments, the normalization of the output values can include dividing the output value by the sum of the exponentials to output a value between 0 and 1.

In some embodiments, the neural network model can include a fully connected layer. In some embodiments, the fully connected layer can determine connections between the input of the layer and the output of the layer based on applying a linear transformation. In some embodiments, the fully connected layer can determine the connections between the input of the layer and the output of the layer based on applying the linear transformation and based on a weights matrix.

The transaction monitor module 128 can monitor the electronic transactions that flow between the plurality of third-party entity devices 110 and the plurality of entity devices 112. In some embodiments, the transaction monitor module 128 can monitor the electronic transactions that flow between the plurality of third-party entity devices 110 and the plurality of entity devices 112 for one or more target accounts based on the APIs between the plurality of third-party entity devices 110 and the plurality of entity devices 112.

In some embodiments, for a given target account, the transaction monitor module 128 can generate a graph of the transactions between the plurality of third-party entity devices 110 and the plurality of entity device 112 associated with the given target account. Each transaction can include data corresponding to a timestamp and a value associated with the transaction. For the given target account, each electronic transaction can be represented as one or more nodes in the graph. In some embodiments, the graph can include a first node, a second node, and a third node. In some embodiments, an account information associated with a user generating an electronic transaction is at a first node, a timestamp and value of the electronic transaction is at a second node, and a target account is at a third node. For each transaction associated with the target account, the graph can include a respective first nodes, second nodes, third nodes, or any combinations thereof. In some embodiments, the transaction monitor module 128 can, based on the graph generated from the transactions for the target account, determine whether the transaction request is a valid or invalid transaction request.

The interface module 130 is configured to receive, as input, a call sequence associated with the transaction request from the third-party entity device 110 to the entity device 112. The interface module 130 can, based on applying the call sequence to one or more predictive models, determines whether the input call sequence is a safe call sequence or is malware. As used herein, the term "malware" refers to malicious data including application software that is insertable into a computing device and is configured to perform one or more malicious activities in a computing device or network including, but not limited to, obtain data in the computing device, send the obtained data to a computing device associated with the malware, damage or destroy the computing device, and other malicious activities.

It is to be appreciated by those having ordinary skill that the threat management system 102 can include multi-lingual authentication module 120, SDM module 122, profile detection module 124, CBM module 126, transaction monitor module 128, interface module 130, or any combinations thereof for performing the threat management in the open transaction network in accordance with the present disclosure. It is also to be appreciated that the system 100 and threat management system 102 can include one or more other additional modules for performing the threat management in the open transaction network in accordance with the present disclosure. In this regard, it is to be appreciated that the system 100 and threat management system 102 is scalable so that the functional modules can not only perform the threat management functionalities for currently known malicious activity or behaviors, but can also be scaled through model training and/or by adding new modules into threat management system 102 that are configured to perform the threat management for potential malicious activity or behaviors in the open transaction network that have yet to be identified.

Various embodiments herein can employ artificial-intelligence, neural network models, deep learning neural network models, and/or machine learning systems and techniques to facilitate managing threats in open transaction networks including identifying suspicious or fraudulent transactions, learning user behavior, context-based scenarios, preferences, etc. in order to facilitate taking automated action with high degrees of confidence at the one or more layers of the open transaction network located between the computing devices performing transactions on the network 114. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or M.L. components 150 herein can comprise artificial intelligence component(s) which can employ an artificial intelligence (AI) model, neural network or a neural network model, M.L. or an M.L. model that can learn to perform the above or below described functions (e.g., via training using historical training data and/or feedback data).

In some embodiments, the system 100 and/or the threat management system 102 can comprise an M.L. component 150 including an A.I. and/or M.L. model that can be trained (e.g., via supervised and/or unsupervised techniques) to perform the above or below-described functions using historical training data comprising various context conditions that correspond to various management operations. In this example, such an A.I. and/or M.L. model can further learn (e.g., via supervised and/or unsupervised techniques) to perform the above or below-described functions using training data comprising feedback data, where such feedback data can be collected and/or stored (e.g., in memory) by an M.L. component 150. In this example, such feedback data can comprise the various instructions described above/below that can be input, for instance, to a system herein, over time in response to observed/stored context-based information.

A.I./M.L. components herein can initiate an operation(s) associated with the one or more functional components of the threat management system 102 based on a defined level of confidence determined using information (e.g., feedback data). For example, based on learning to perform such functions described above using feedback data, performance information, and/or past performance information herein, an M.L. component 150 herein can initiate an operation associated with multi-lingual authentication of a transaction request to authenticate a user of the request as a legitimate customer, generate global graphs based on high-order interactions in global data and local graphs based on the global graph and local interaction data of a user at the local computing device to output tokenized and/or encrypted embeddings representative of sensitive user data, detect if a user profile associated with the request is a cloned profile, predict if a transaction is a fraudulent transaction or authentic transaction based on applying an A.I. model or M.L. model, monitoring third-party transactions to identify fraudulent transactions, and enhancing API security by comparing a chain sequence to one or more A.I. models or M.L. models and based on a sequence threshold. In another example, based on learning to perform such functions described above using feedback data, an M.L. component 150 herein can initiate an operation associated with updating a model (e.g., a tuning model herein).

In an embodiment, the M.L. component 150 can perform a utility-based analysis that factors cost of initiating the above-described operations versus benefit. In this embodiment, an artificial intelligence component can use one or more additional context conditions to determine an appropriate distance threshold or context information, or to determine an update for a tuning model.

To facilitate the above-described functions, an M.L. component 150 herein can perform classifications, correlations, inferences, and/or expressions associated with principles of artificial intelligence. For instance, an M.L. component 150 can employ an automatic classification system and/or an automatic classification. In one example, the M.L. component 150 can employ a probabilistic and/or statistical-based analysis (e.g., factoring into the analysis utilities and costs) to learn and/or generate inferences. The M.L. component 150 can employ any suitable machine-learning based techniques, statistical-based techniques and/or probabilistic-based techniques. For example, the M.L. component 150 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the M.L. component 150 can perform a set of machine-learning computations. For instance, the M.L. component 150 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

In some embodiments, the M.L. component 150 can utilize one or more clustering techniques including, but not limited to, density-based clustering, distribution-based clustering, centroid-based clustering, hierarchical based clustering, or any combinations thereof. In addition, the one or more models can apply one or more clustering algorithms including, but not limited to, k-means clustering algorithms, density-based clustering algorithms, Gaussian mixture model algorithms, balanced iterative reducing and clustering using hierarchies (BIRCH) algorithms, propagation clustering algorithms, mean-shift clustering algorithms, order point clustering, agglomerative hierarchy clustering algorithms, other algorithms, or any combinations thereof. For example, the model component 150 can apply the one or more centroid-based clustering models to determine clusters using k-means clustering algorithms.

The non-transitory computer readable memory 118 can include one or more datasets that can be obtained by the one or more functional modules of the threat management system 102 for performing the threat managements between the layers of the open transaction network. In some embodiments, the datastore 104 can include therein one or more datasets that can be obtained by the one or more functional modules of the threat management system 102 for performing the threat managements between the layers of the open transaction network.

In some embodiments, the data stored in datastore 104 can include, but is not limited to, token ontology data, suspicious word data, knowledge data, language identification data, language dictionary, morphological lexicon data, grammar rules data, parts-of-speech data, category data, or any combinations thereof, for the multi-lingual authentication module 120.

In some embodiments, the data stored in datastore 104 can include, but is not limited to, global graphs, local subgraphs, embeddings data, encryption data, tokenization data, or any combinations thereof, for the SDM module 122.

In some embodiments, the data stored in datastore 104 can include, but is not limited to, profile data, cloned profile data, attribute data, feature data, verification data, or any combinations thereof, for the profile detection module 124.

In some embodiments, the data stored in datastore 104 can include, but is not limited to, source customer data, device data, user login data, API traffic log data, reference data, source transaction data, target transaction data, neutral network models associated therewith, or any combinations thereof, for the CBM module 126.

In some embodiments, the data stored in datastore 104 can include, but is not limited to, transaction record data, timestamp data, value data, target account data, or any combinations thereof, for the transaction monitor module 128.

In some embodiments, the data stored in datastore 104 can include, but is not limited to, model data, matrices, cluster sequences, chain matrices, algorithms, or any combinations thereof, for the interface module 130.

It is to be appreciated that the data for enabling the threat management system 102, and the one or more functional modules therein, to perform the threat management at the one or more layers between the other layers associated with the user device 108, third-party entity device 110, and entity device 112 can be stored in datastore 104, memory 118, or both. It is also to be appreciated that the datastore 104 and/or the memory 118 can further include therein other data to enable the threat management system 102 to perform the one or more threat management operations in accordance with the present disclosure.

Users of system 100 can perform one or more operations including initiating electronic transactions on user devices 108 through transaction processing system 106. In some embodiments, the user can initiate the transactions on user device 108 using a call sequence sent from the user device 108 to the third-party entity device 110 using transaction processing system 106. Accordingly, the transaction processing system 106 can receive from user devices 108 instructions including for initiating transactions, accepting transactions, completing transactions, canceling transactions, reviewing transactions, etc., and the transaction processing system 106 can respond by performing or facilitating the requested user action.

The third-party entities of system 100 can also perform one or more operations including initiating electronic transactions on the entity device 112. In some embodiments, the third-party entity can initiate the transactions on third-party entity device 110 using a call sequence sent from the third-party entity device 110 to the entity device 112 using transaction processing system 106. Accordingly, the transaction processing system 106 can receive from third-party entity device 110 instructions including for initiating transactions, accepting transactions, completing transactions, canceling transactions, reviewing transactions, etc., and the transaction processing system 106 can respond by performing or facilitating the requested user action.

In some embodiments, the electronic transactions from the user devices 108, third-party entity device 110, entity device 112, or any combinations thereof, can be triggered based on activity on the respective target network by the respective user device 108, third-party entity device 110, and the entity device 112.

The transaction processing system 106 can be associated with a particular electronic user interface and/or platform through which a user performs the electronic transactions. The electronic user interface can be embodied in a website, mobile application, etc. Accordingly, the transaction processing system 106 may be associated with or wholly or partially embodied in one or more servers, which server(s) may host the interface, and through which the computing devices associated with the user device 108, third-party entity device 110, and entity device 112 may access the user interface.

The user computing devices 108 may be respectively associated with different user accounts. That is, user computing device 108a may be associated with a first user account, and user computing device 108b may be associated with a second user account. Where user computing devices are discussed herein, it may be assumed that different devices are associated with different user accounts for convenience of description, though of course a single user account may be accessed from multiple devices in practical use.

Figure 2:
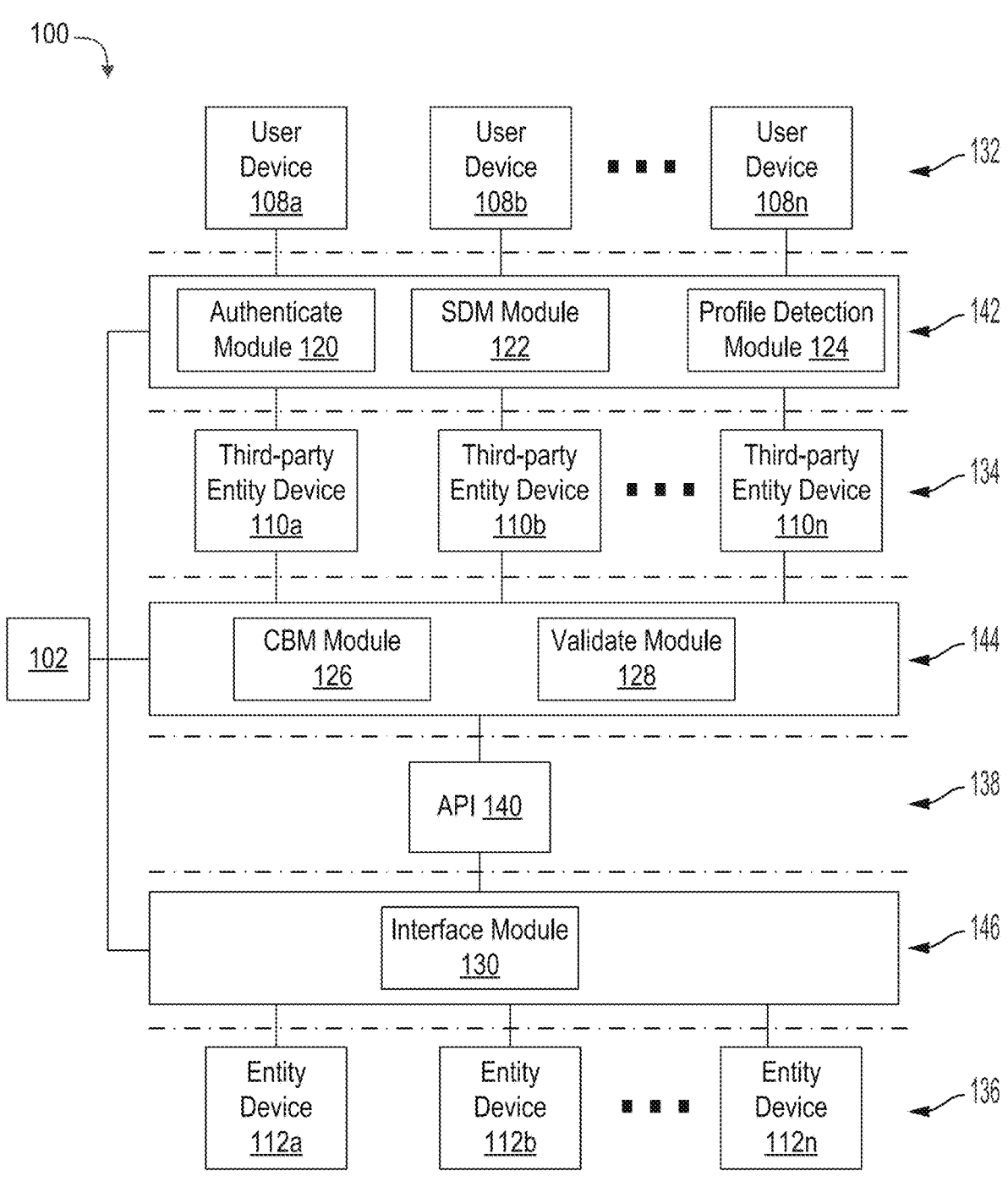
FIG. 2 is a block diagram illustrating the system, according to some embodiments.

FIG. 2 is a block diagram illustrating the system 100, according to some embodiments. The open transaction network can include layer 132, layer 134, and layer 136. Layer 132 can be associated with user devices 108 (user devices 108a, 108b, through 108n are shown). Layer 134 can be associated with third-party entity devices 110 (third-party entity device 110a, 110b, through 110n are shown). Layer 136 can be associated with entity devices 112 (entity device 112a, entity device 112b, through 112n are shown).

According to some embodiments, the open transaction network can include one or more additional layers. In some embodiments, the one or more additional layers can be for interfaces. The interface enables sending and receiving calling and return sequences between the devices at the respective layers.

In some embodiments, the open transaction network can include layer 138. In some embodiments, the layer 138 can be associated with API 140. The API 140 enables sending and receiving calling and return sequences between the third-party entity devices 110 in layer 134 and the entity devices 112 in the layer 136. In other embodiments, the layer 138 can be associated with a plurality of APIs such as API 140 for sending call and return sequences between the layer 134 and layer 136. The open transaction network can include other additional layers associated with other interfaces for sending and receiving call and return sequences between adjacent layers in the open transaction network. For example, in some embodiments, the open transaction network can include a layer between layer 132 and layer 134 including an interface therein.

The open transaction network can include one or more layers associated with the one or more functional modules of the threat management system 102 of system 100. The one or more functional modules of threat management system 102 can be applied at these one or more layers of the open transaction network. The one or more layers associated with system 100 and threat management system 102 can be located between layer 132, layer 134, layer 136, layer 138, or any combinations thereof. In this regard, the one or more layers associated with system 100 and threat management system 102 can be between the respective layers associated with user devices 108, third-party entity devices 110, entity devices 112, API 140, or any combinations thereof. In some embodiments, the open transaction network can include one or more additional layers for other devices, interfaces, and the like for performing the electronic transactions and the system 100 can be applied at layers located between the respective additional layers.

In some embodiments, the open transaction network can include a layer 142, a layer 144, and a layer 146. The layer 142 is located between layer 132 and layer 134. The layer 144 is located between layer 134 and layer 136. In some embodiments, the open transaction network includes layer 138 located between layer 134 and layer 136, and the layer 144 is then located between layer 134 and layer 138. The layer 146 is located between layer 134 and layer 136. In some embodiments, the open transaction network includes layer 138 located between layer 134 and layer 136, and the layer 146 is then located between layer 138 and layer 136.

The system 100 can apply the one or more functional modules of threat management system 102 at the layer 142, layer 144, layer 146, or any combinations thereof. In some embodiments, the system 100 and threat management system 102 can apply the multi-lingual authentication module 120, SDM module 122, profile detection module 124, other modules, or any combinations thereof, at the layer 142. For example, in some embodiments, the system 100 and threat management system 102 can apply the multi-lingual authentication module 120, SDM module 122, or profile detection module 124 at layer 142. In another example, in some embodiments, the system 100 and threat management system 102 can apply one or more of the multi-lingual authentication module 120, SDM module 122, and profile detection module 124 at layer 142. The system 100 and threat management system 102 can also apply one or more other modules of the threat management system 102 at the layer 142, according to some embodiments.

In some embodiments, the system 100 and the threat management system 102 can apply the CBM module 126, transaction monitor module 128, other modules, or any combinations thereof, at layer 144. In some embodiments, the system 100 and the threat management system 102 can apply the CBM module 126 or the transaction monitor module 128 at the layer 144. In other embodiments, the system 100 and the threat management system 102 can apply the CBM module 126 and the transaction monitor module 128 at the layer 144. The system 100 and threat management system 102 can also apply one or more other modules of the threat management system 102 at the layer 144, according to some embodiments.

In some embodiments, the open transaction network can include layer 138 located between layer 134 and layer 136, and the open transaction network can include layer 146 located between layer 138 and layer 136. In some embodiments, the system 100 and the threat management system 102 can apply interface module 130 at layer 146.

FIG. 3 is a flow diagram illustrating an example method 200 of performing the threat management in an open transaction network, according to some embodiments. The method 200, or one or more portions thereof, can be performed by the functional modules in threat management system 102 in conjunction with datastore 104, transaction processing system 106, network 114, or any combinations thereof, and thus may be computer implemented.

The open transaction network can perform threat management at one or more layers. In some embodiments, the one or more layers can include a first layer, a second layer, and a third layer.

At 202, the method 200 includes applying data corresponding to a first request obtained from a first computing device to a first graph to determine one or more first embeddings and one or more second embeddings.

In some embodiments, the first request can be obtained at a first layer. In some embodiments, the first layer can be a network layer located between the first computing device and a second computing device. In some embodiments, at the first layer, the data corresponding to the first request can be applied to the first graph to determine the one or more first embeddings and one or more second embeddings. In some embodiments, the data corresponding to the first request can be applied to the first graph to extract the one or more first embeddings and the one or more second embeddings. In some embodiments, the first graph is based on a global graph. In some embodiments, the first graph can be a local subgraph including one or more nodes extracted from the global graph.

In some embodiments, a plurality of first transaction requests can be obtained at the first layer from a plurality of computing devices associated with users of the open transaction network. In some embodiments, the plurality of first transaction requests can include the first request from the first computing device. The first request can be for at least a second computing device to perform one or more processing operations such as, for example, electronic transactions with one or more other computing devices. For example, the first request can be for a second computing device to obtain account data of a user from a third computing device.

In some embodiments, the plurality of first transaction requests includes the first request, and each of the plurality of first transaction requests obtained at the first layer can include therein one or more data types. In some embodiments, each of the first transaction requests can include a first data type, a second data type, one or more other data types, or any combinations thereof. In some embodiments, each of the first transaction requests can include the first data type and the second data type. In some embodiments, the first request can include the first data type and the second data type.

In some embodiments, each of the first transaction requests can include data associated with a user of the respective first computing device. In some embodiments, each of the first transaction requests can include sensitive data and/or non-sensitive data of the respective user. In some embodiments, the first data type can be sensitive data, and the second data type can be non-sensitive data. In some embodiments, the first request can include sensitive data and non-sensitive data.

In some embodiments, each of the first transaction requests can include local data associated with the respective user. In some embodiments, the local data can include, but is not limited to, user data, user profile data, location data, transaction data, historical data, user behavior data, device data, other data, or any combinations thereof. In some embodiments, the local data in the first request can be local interaction data of the user.

In some embodiments, the first graph is a subgraph associated with the user of the first request determined from the global graph based on local data in the first request. In some embodiments, the first request can be applied to the subgraph and the one or more of the first embeddings and the one or more second embeddings can be provided as output. In some embodiments, the data corresponding to the first request includes the first data type and the second data type, and the one or more first embeddings provided as output can correspond to the first data type and the one or more second embeddings provided as output can correspond to the second data type. In some embodiments, the data corresponding to the first request can be applied to the first graph and the data can be classified as sensitive data or non-sensitive based on the attributes associated with the data and based on the allocation of the data in the graph space of the first graph. In some embodiments, based on the allocation of the data corresponding to the first request in the first graph, the non-sensitive data in the first request can be output as the one or more first embeddings and the sensitive data in the first request can be output as the one or more second embeddings.

In some embodiments, the one or more of the first embeddings and the one or more second embeddings can be represented by vectors. In some embodiments, the one or more second embeddings corresponds to sensitive data associated with the user of the first request. In some embodiments, to protect the sensitive data associated with the user generating the first request, the second embeddings can be encrypted and/or tokenized. In some embodiments, the second embeddings can be encrypted sensitive data. In some embodiments, the second embeddings can be tokenized sensitive data. In some embodiments, the second embeddings can be encrypted sensitive data, tokenized sensitive data, or both.

In some embodiments, the method 200 may include obtaining a plurality of first transaction requests including the first request. In some embodiments, the method 200 may include, for each of the plurality of first transaction requests, extracting a respective graph from the global graph based on local data in the respective first transaction request. In some embodiments, the respective graph being one of a plurality of local subgraphs extracted from the global graph based on the local data in the respective first transaction request. In some embodiments, the method 300 may include applying the data corresponding to the respective first transaction request to the respective graph to determine a respective one or more first embeddings and a respective one or more second embeddings. In some embodiments, the method 200 may include sending the one or more first embeddings and the one or more second embeddings corresponding to the first request to the second computing device.

At 204, the method 200 includes classifying a second request obtained from a second computing device as a first request type or a second request type based on applying data corresponding to the second request to a second graph. In some embodiments, the classification of the second request as the first request type or the second request type can be performed at a second layer of the open transaction network.

In some embodiments, the second request includes data corresponding to one or more second electronic transactions to be performed by the second computing device. In some embodiments, the second request can be performed by the second computing device and one or more other computing devices on the open transaction network. In some embodiments, the second request can be determined based on the first request. In some embodiments, the second request can include the one or more first embeddings and the one or more second embeddings. In some embodiments, the second request can include embeddings from the one or more first embeddings, the one or more second embeddings, or any combinations thereof.

At 208, the method 200 includes predicting an authenticity of a call sequence obtained from the second computing device by applying the call sequence to a third graph and based on a sequence threshold. In some embodiments, the authenticity of the call sequence can be determined at a third layer of the open transaction network.

In some embodiments, the second computing device can send the call sequence to another computing device using an application interface. For example, the call sequence can be sent by the second computing device to a respective third computing device of a plurality of third computing devices. In some embodiments, the call sequence can be based on the second request. In some embodiments, the call sequence can include the second request. In some embodiments, the second computing device can send call sequences corresponding to processing transactions to other computing devices through the third layer of the open transaction network using the interface. In some embodiments, the interface may be stored in the second computing device and the other computing devices to enable the call sequences to be sent and received between the computing devices and through the third layer. In some embodiments, the interface may be an application programming interface ("API").

In some embodiments, a plurality of second computing devices can send and receive call sequences with other computing devices through the third layer. In some embodiments, the plurality of second computing devices can include the respective second computing device sending the call sequence for authentication at operation 208. In some embodiments, each of the plurality of second computing devices can include a memory device having stored thereon data corresponding to the interface for sending and receiving call sequences with other computing devices through the third layer. In some embodiments, the other computing devices can also include a memory device having stored thereon data corresponding to the interface for sending and receiving call sequences with other computing devices such as the second computing devices through the third layer.

In some embodiments, at the third layer, the call sequences can be applied to the third graph and the authenticity of the call sequences can be predicted based on a sequence threshold. In some embodiments, in response to the prediction, the call sequence can be provided as output from the third layer to the other computing device. In other embodiments, in response to the prediction, an alert may be generated and sent to at least one of the second computing device and the other computing device. In some embodiments, the call sequence can include the data corresponding to the second request. In some embodiments, the output can include the prediction results.

Figure 4:
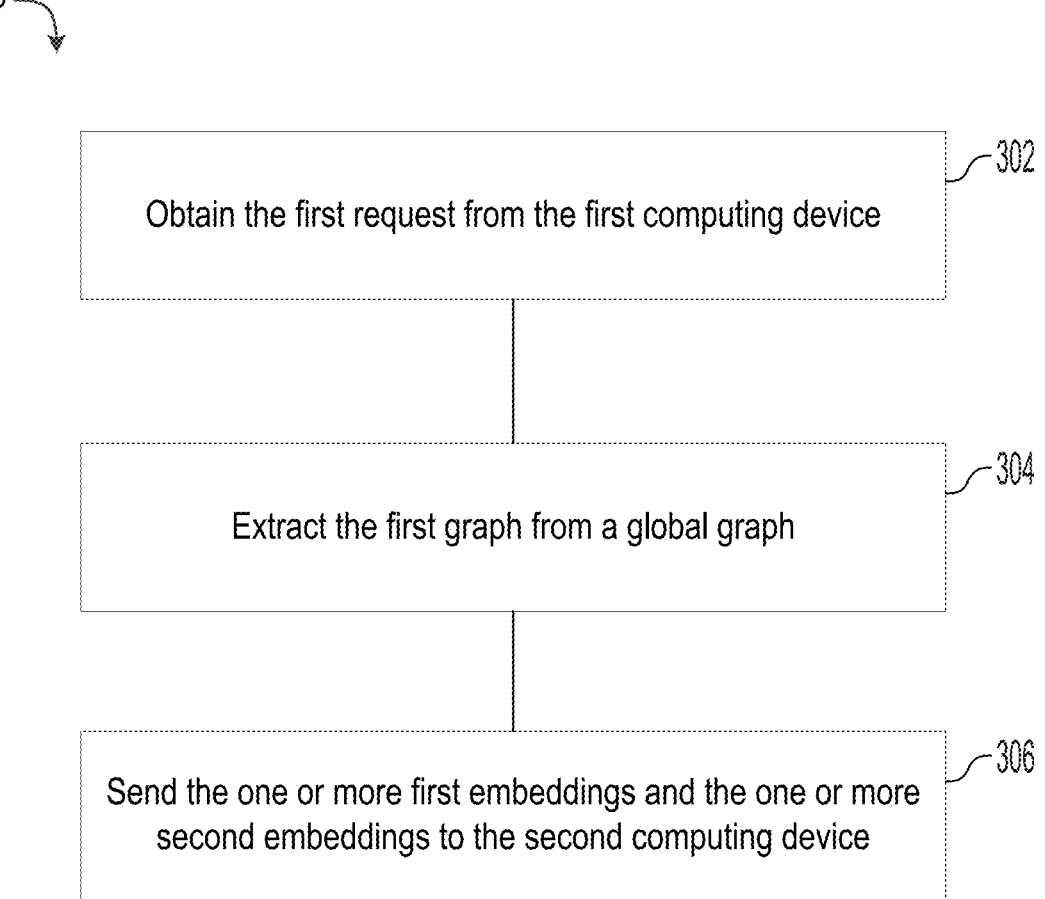
FIG. 4 is a flow diagram illustrating an example method of applying data from the first computing device to the subgraph to determine one or more first embeddings and one or more second embeddings based on the first request from the first computing device, according to some embodiments.

FIG. 4 is a flow diagram illustrating an example method 300 of applying data from the first computing device to the subgraph to determine one or more first embeddings and one or more second embeddings based on the first request from the first computing device, according to some embodiments. The method 300 may be an embodiment of operation 202 of method 200 of FIG. 3. The method 300, or one or more portions thereof, can be performed by the threat management system 102 in conjunction with datastore 104, transaction processing system 106, network 114, or any combinations thereof, and thus may be computer-implemented. In some embodiments, the method 300 can be performed by the SDM module 122 in threat management system 102 of FIG. 1.

Figure 5:
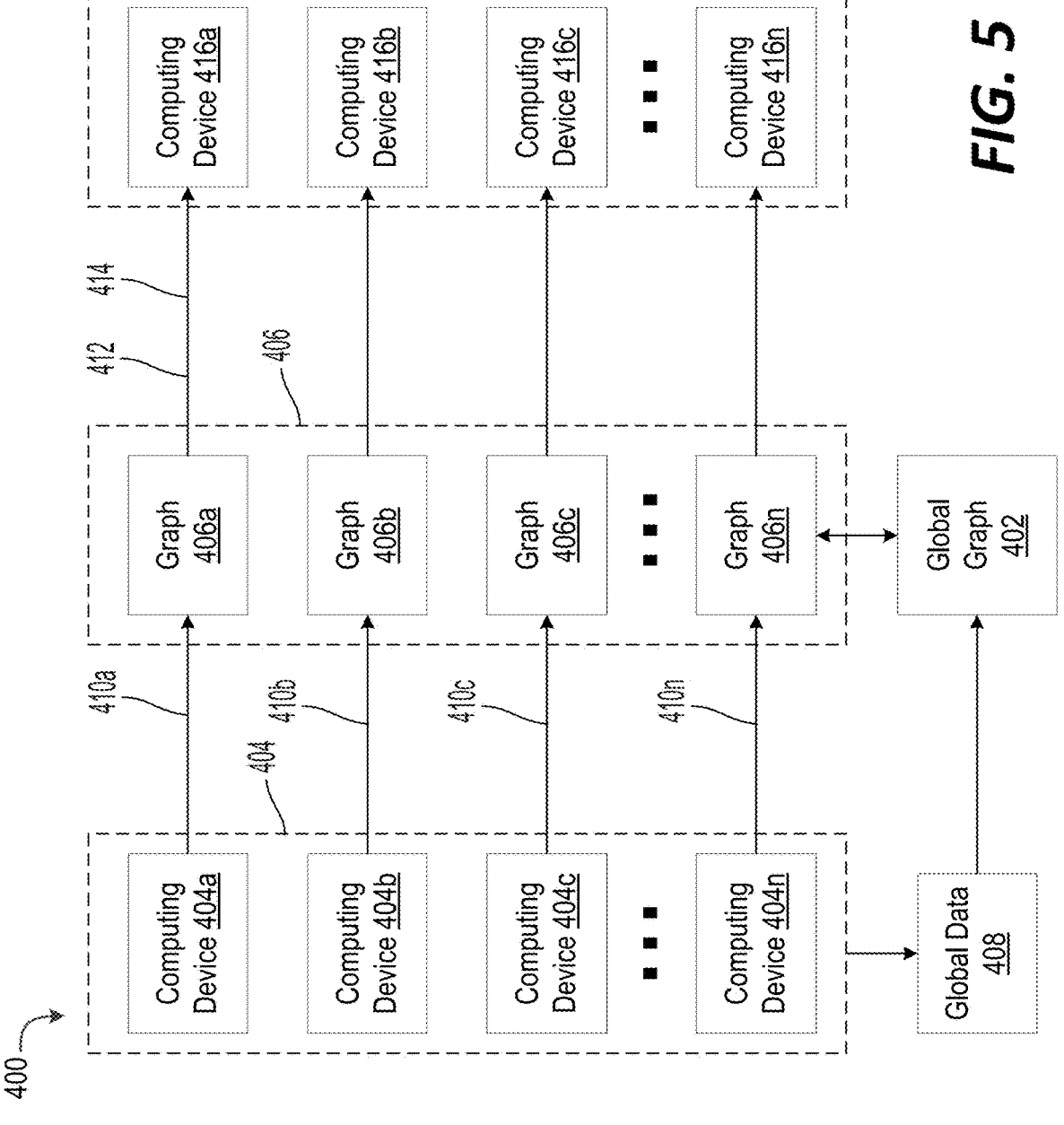
FIG. 5 is a block diagram of a system, according to some embodiments.

FIG. 5 is a block diagram of a system 400, according to some embodiments. The system 400 can perform one or more methods including method 200, method 300, method 500, method 600, or portions thereof, according to some embodiments. The method 300 will be described in conjunction with system 400. In some embodiments, the system 100 can include system 400 at SDM module 122 in the threat management system 102 in FIG. 1.

At 302, the method 300 includes obtaining the first request from the first computing device. In FIG. 5, the first computing device is shown as, for example, user device 404a and the first request is shown as request 410a.

At 304, the method 300 includes extracting the first graph from a global graph. In some embodiments, the first graph is determined based on data in the first request. In some embodiments, the first graph is determined based on local data in the first request. In other embodiments, the first graph is determined based on local interaction data associated with the user obtained from the first computing device. In some embodiments, the first graph is a subgraph extracted from the global graph based on the first request. In FIG. 5, the first graph is shown as graph 406a, and the global graph is shown as global graph 402.

In some embodiments, the global graph can be representative of high-order customer data. In some embodiments, the global graph can be representative of node interactions. Based on a request, the subgraph can be extracted from the global graph. In this regard, a plurality of subgraphs can be extracted from the global graph based on a plurality of requests obtained from a plurality of first computing devices. Each subgraph of the plurality of subgraphs can be inferred from the global graph based on the respective request of the plurality of requests, each subgraph thereby being representative of local interactions associated with the respective first computing device and the respective user. In this regard, each subgraph is extracted from the global graph based on the data in the respective request. In some embodiments, the requests can include local interaction data, and the subgraph can be extracted from the global graph based on the respective local interaction data. That is, the nodes of the subgraph extracted from the global graph can be determined using the local interaction data. For example, each node of the subgraph can be extracted from the global graph based on having one or more similar features as a respective node in the global graph.

The global graph can include therein a plurality of nodes representative of the global data. In some embodiments, the nodes can be representative of sensitive data and non-sensitive data associated with the plurality of users from the global data. In the global graph, the nodes can be partitioned into clusters, each cluster representing sensitive data or non-sensitive data of the users.

At 306, the method 300 includes sending the one or more first embeddings and the one or more second embeddings to the second computing device. In FIG. 5, the first embeddings are shown as first embeddings 412 and the second embeddings are shown as second embeddings 414.

As the first request can include sensitive data and non-sensitive data associated with the user, there are privacy-related risks associated with sharing any sensitive data of the user with other computing devices. For example, the data can be obtained by malicious actors that can then utilize the sensitive data for malicious purposes. By inferring the subgraph associated with the first computing device from the global graph based on the local interaction data, the data of the first request can be applied to the subgraph to classify the data of the first request as sensitive data and non-sensitive data, respectively, and the data corresponding to the one or more first embeddings and the one or more second embeddings can be provided as output to the second computing device. The second computing device is shown as, for example, computing device 416a in FIG. 5.

Figure 6:
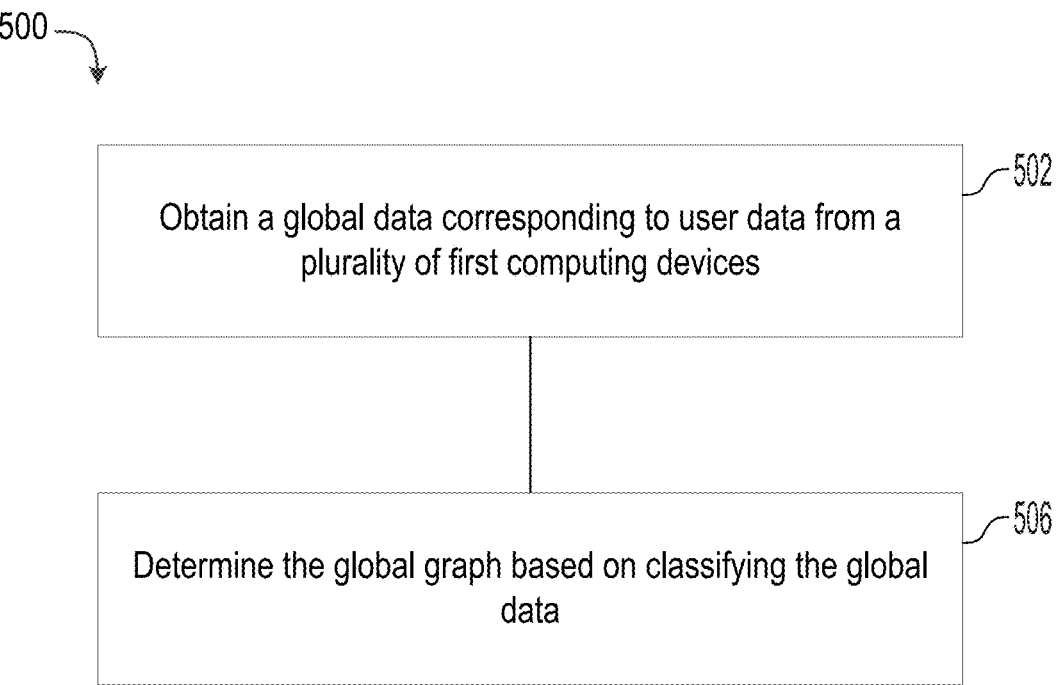
FIG. 6 is a flow diagram illustrating an example method of applying data from the first computing device to the local subgraph to determine one or more first embeddings and one or more second embeddings based on the first request from the first computing device, according to some embodiments.

FIG. 6 is a flow diagram illustrating an example method 500 of applying data from the first computing device to the local subgraph to determine one or more first embeddings and one or more second embeddings based on the first request from the first computing device, according to some embodiments. The method 500 may be an embodiment of operations 202 of method 200 of FIG. 3. The method 500 may be an embodiment of operations 302, 304, 306 of the method 300 of FIG. 4. The method 500, or one or more portions thereof, may be performed by the threat management system 102 in conjunction with datastore 104, transaction processing system 106, network 114, or any combinations thereof, and thus may be computer-implemented. In some embodiments, the method 500 can be performed by the SDM module 122 in threat management system 102 of FIG. 1. The system 400 can perform the method 500, according to some embodiments. The method 500 will be described in conjunction with system 400.

At 502, the method 500 includes obtaining global data corresponding to user data from a plurality of first computing devices. In some embodiments, the global data can be high order data determined based on one or more requests from a plurality of computing devices associated with a plurality of users obtained at the first layer. In some embodiments, the plurality of computing devices can include the first computing device associated with the user of the first request. In some embodiments, the plurality of requests correspond to respective processing transactions to be performed by a plurality of computing devices such as the second computing device. In some embodiments, the plurality of requests can further correspond to respective local interaction data associated with the respective users of the plurality of computing devices. The global data is shown as global data 408 in system 400 of FIG. 5. The plurality of requests are shown as requests 410a, 410b, 410c, through 410n in FIG. 5. The plurality of second computing devices are shown as computing devices 416a, 416b, 416c, through 416n in FIG. 5.

At 504, the method 500 includes determining the global graph based on classifying the global data. In some embodiments, the global data can be encoded into respective embeddings and allocated to respective embedding spaces of the global graph based on applying one or more encoding algorithms to the global data. The nodes of the global graph thereby being representative of the global data. In some embodiments, the global data corresponds to sensitive data and non-sensitive data associated with the plurality of users of the plurality of first computing devices. By encoding the global data, the sensitive data and non-sensitive data can be transformed into respective embeddings and allocated to the respective embedding spaces of the global graph.

Figure 7:
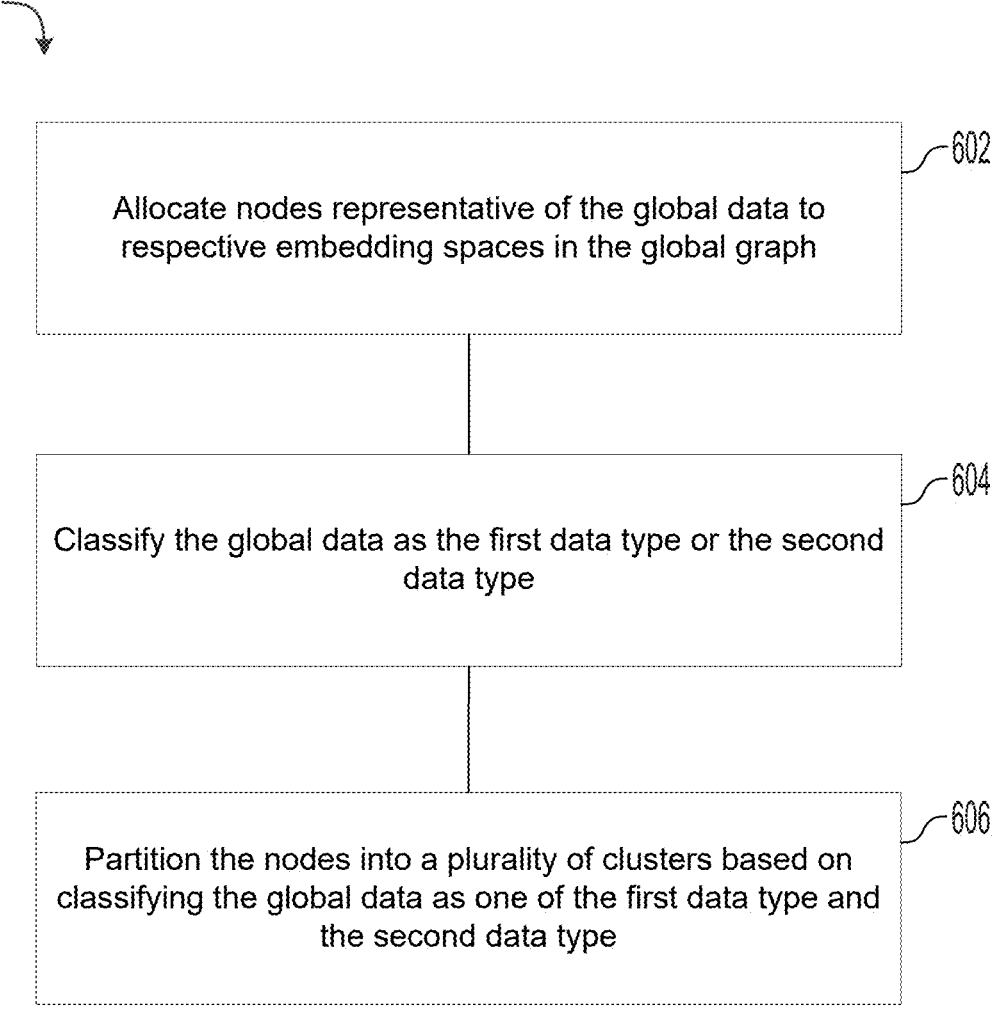
FIG. 7 is a flow diagram illustrating an example method of determining the global graph based on classifying the global data, according to some embodiments.

FIG. 7 is a flow diagram illustrating an example method 600 of determining the global graph based on classifying the global data, according to some embodiments. The method 600 may be an embodiment of operations 202 of the method 200 of FIG. 3. The method 600 may be an embodiment of operations 302, 304, 306 of the method 300 of FIG. 5. The method 600 may be an embodiment of operations 502, 504 of the method 500 of FIG. 6. The method 600, or one or more portions thereof, may be performed by the threat management system 102 in conjunction with datastore 104, transaction processing system 106, network 114, or any combinations thereof, and thus may be computer-implemented. In some embodiments, the method 600 can be performed by the SDM module 122 in threat management system 102 of FIG. 1. The system 400 can perform the method 600, according to some embodiments. The method 600 will be described in conjunction with system 400.

At 602, the method 600 includes allocating nodes representative of the global data to respective embedding spaces in the global graph.

In some embodiments, the global data can include data associated with a plurality of users of the plurality of first computing devices performing transactions in the open transaction network, the plurality of first computing devices including the first computing device of the first request. In some embodiments, the method 600 includes encoding the global data into one or more embeddings based on applying one or more encoding algorithms. In some embodiments, the one or more embeddings can be allocated to respective embedding spaces in the global graph based on the vector values of the respective embeddings.

At 604, the method 600 includes classifying the global data as the first data type or the second data type. In some embodiments, the global data can be one of the first data type and the second data type. In some embodiments, the global data can be determined to be one of the first data type and the second data type based on the features associated with the data.

In some embodiments, by encoding and transforming the global data into the one or more embeddings, the embeddings can be allocated to the respective embedding spaces of the global graph based on the attributes of the respective embeddings. In some embodiments, the one or more embeddings representative of the global data can be classified as one of the first data type and the second data type based on attributes associated with the data. For example, the embeddings can be classified as one of the first data type and the second data type based on the vector values of the embeddings. In some embodiments, the global data can be labeled, and the data can be classified as one of the first data type and the second data type based on the labels. In some embodiments, the first data type corresponds to non-sensitive data and the second data type corresponds to sensitive data.

At 606, the method 600 includes partitioning the nodes into a plurality of clusters based on classifying the global data as one of the first data type and the second data type. In some embodiments, the plurality of clusters can include one or more first clusters and one or more second clusters. In some embodiments, the one or more first clusters can be representative of the first data type. In some embodiments, the one or more second clusters can be representative of the second data type.

In some embodiments, the nodes of the global graph can be partitioned into respective clusters of the plurality of clusters based on attributes associated with each node. In some embodiments, the nodes can be partitioned into the plurality of clusters by applying one or more cluster algorithms to the nodes. Each cluster including a respective group of nodes therein. In some embodiments, the respective group of nodes in a cluster can be representative of one of the first data type and the second data type.

In some embodiments, the plurality of clusters can include one or more first clusters and one or more second clusters. In some embodiments, the one or more first clusters can be representative of the first data type. In some embodiments, the one or more first clusters can be representative of the non-sensitive data. In some embodiments, the one or more second clusters can be representative of the second data type. In some embodiments, the one or more second clusters can be representative of the sensitive data. In this regard, each cluster of the one or more clusters can include therein a respective group of nodes representative of one of the non-sensitive data and the sensitive data.

In some embodiments, the one or more first embeddings and the one or more second embeddings can be output based on applying the first request to the first graph. In some embodiments, the one or more first embeddings can be determined based on the one or more first clusters and the respective nodes therein. In some embodiments, the one or more second embeddings can be determined based on the one or more second clusters and the respective nodes therein. In some embodiments, the one or more first embeddings can correspond to non-sensitive data from the first request and the one or more second embeddings can correspond to encrypted sensitive data from the first request. In some embodiments, the one or more second embeddings can correspond to encrypted and/or tokenized sensitive data associated with the user of the first computing device determined based on the one or more second clusters in the first graph. In some embodiments, the one or more first embeddings corresponding to non-sensitive data associated with a user of the first computing device, and the one or more second embeddings corresponding to encrypted tokenized sensitive data associated with the user of the first computing device.

In some embodiments, the first graph is a subgraph of the global graph. In some embodiments, for each request obtained at the first layer, a corresponding graph can be extracted from the global graph. The graph that is extracted from the global graph being a subgraph thereof. The nodes that are extracted from the global graph to make up each respective subgraph can be based on the respective first computing device of the plurality of first computing devices providing the request. In some embodiments, the nodes that make up the subgraph and extracted from the global graph can be based on data of the respective first computing device. In some embodiments, the nodes that make up the subgraph and extracted from the global graph can be based on local interaction data at the respective first computing device. In some embodiments, the nodes that make up the subgraph and extracted from the global graph can be based on the data corresponding to the respective request that is obtained from the respective first computing device. It is to be appreciated that for each of the plurality of first computing devices utilizing the open transaction network, a respective subgraph associated with the user of the respective first computing device can be extracted from the global graph in response to obtaining a request from the respective first computing device.

Figure 8:
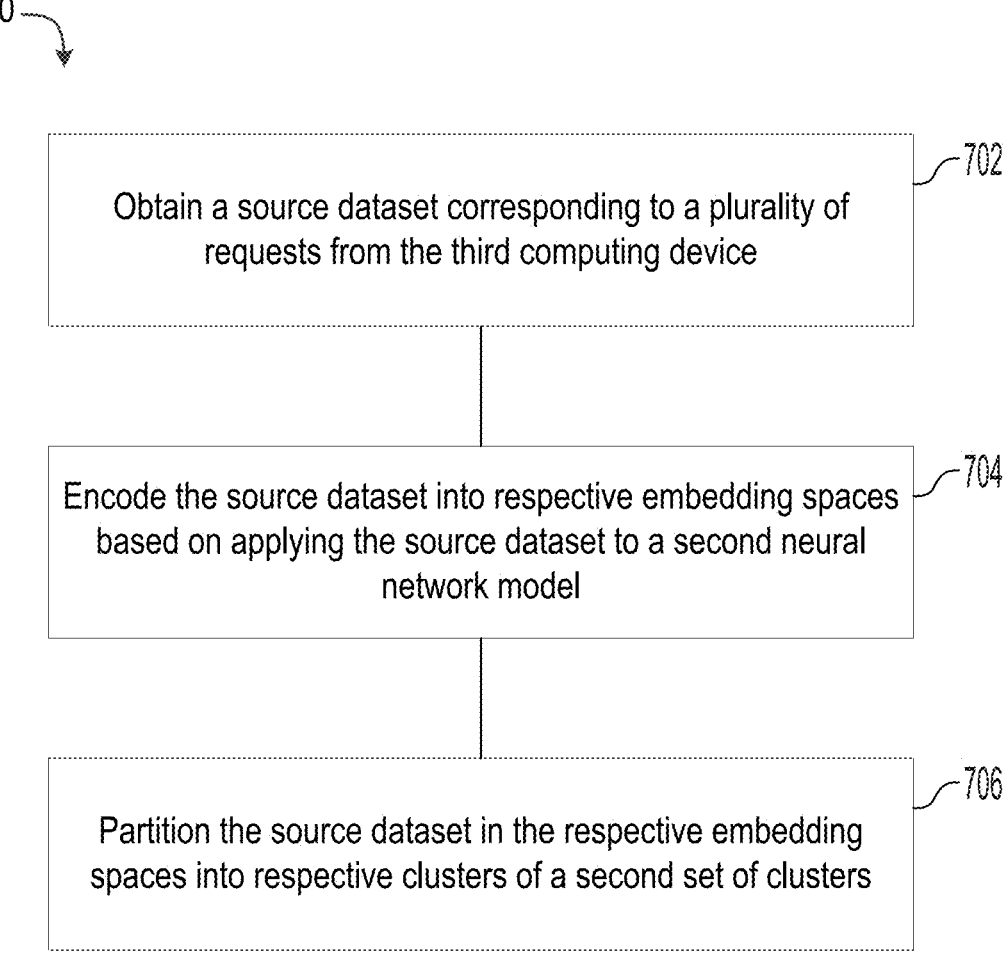
FIG. 8 is a flow diagram of an example method of classifying a second request obtained from a second computing device as a first request type or a second request type based on encoding data corresponding to the second request into one or more clusters, according to some embodiments.

FIG. 8 is a flow diagram of an example method 700 of classifying a second request obtained from a second computing device as a first request type or a second request type based on applying data corresponding to the second request to a second graph, according to some embodiments. The method 700 may be an embodiment of operations 204 of the method 200 of FIG. 3. The method 700, or one or more portions thereof, may be performed by the threat management system 102 in conjunction with datastore 104, transaction processing system 106, network 114, or any combinations thereof, and thus may be computer-implemented. In some embodiments, the method 700 can be performed by CBM module 126 in threat management system 102 of FIG. 1.

Figure 9:
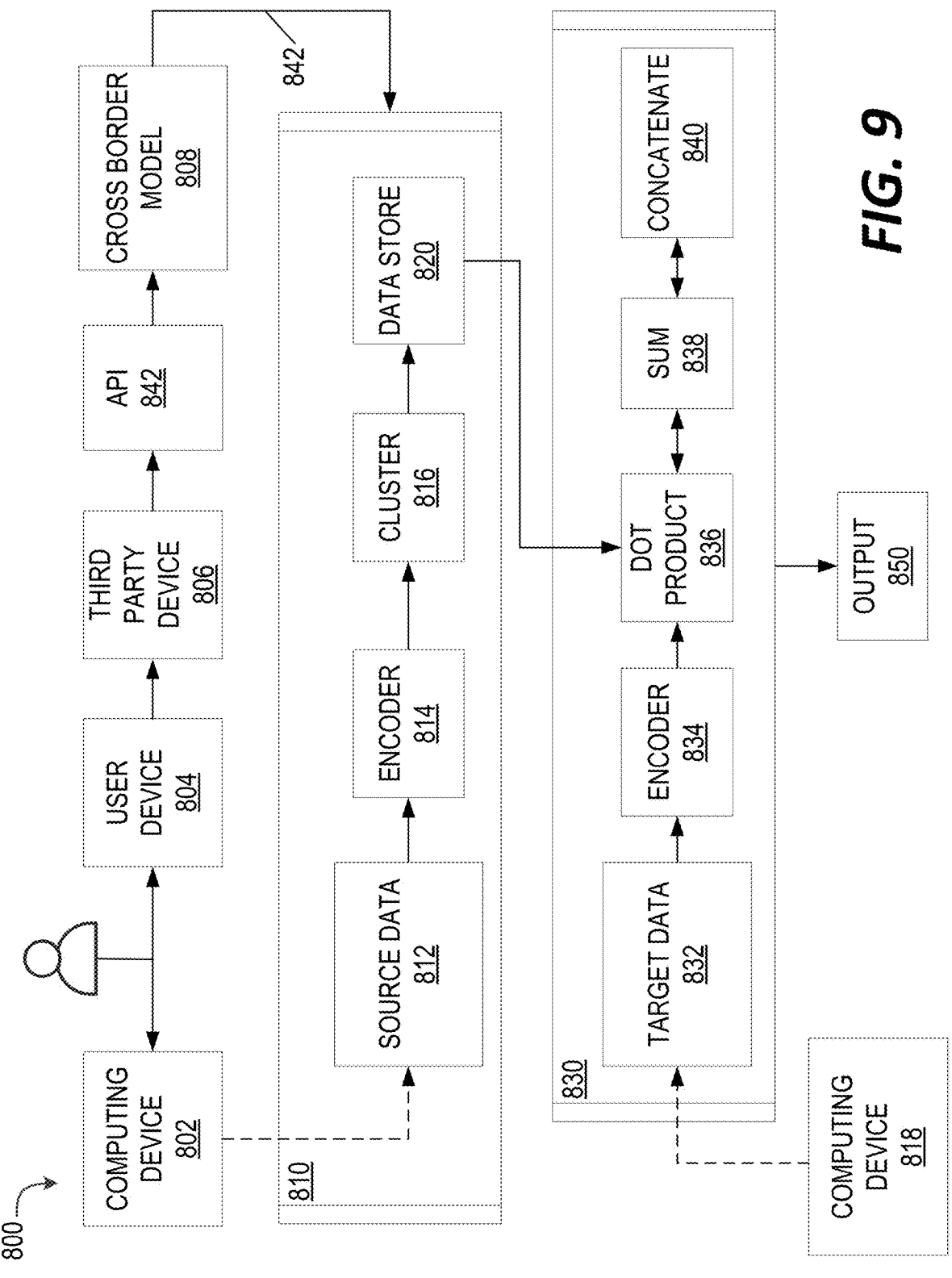
FIG. 9 is a block diagram of an example system, according to some embodiments.

FIG. 9 is a block diagram of an example system 800, according to some embodiments. The system 800 can perform the method 700 in FIG. 8, and can perform the method 900 in FIG. 10, according to some embodiments. The method 700 will be described in conjunction with system 800.

At 702, the method 700 includes obtaining a source dataset corresponding to a plurality or requests from a third computing device.

The source dataset can include the plurality of transaction requests. In some embodiments, each transaction request of the plurality of transaction requests can be one of a first request type and a second request type. In some embodiments, the plurality of transaction requests can include therein labeled data, unlabeled data, or combinations thereof. In some embodiments, one or more of the transaction requests in the source dataset can be labeled as one of the first request type and the second request type. In other embodiments, one or more of the transaction requests in the source dataset can be unlabeled. In some embodiments, the first request type can be fraudulent transactions and the second request type can be authentic transactions. The source dataset is shown as source data 812 in FIG. 9.

In some embodiments, the third computing device can be associated with a first entity. The source dataset can correspond to a plurality of transaction requests from one or more second computing devices. In some embodiments, the plurality of transaction requests in the source dataset can also be based on transaction requests from one or more first computing devices.

In some embodiments, the method 700 can include obtaining the second request from the second computing device. The second request can be based on the first request from the first computing device. In some embodiments, the second request can be obtained at a second layer of the open transaction network using, for example, an API. The second request is shown as second request 842 in FIG. 9. The second computing device is shown as third-party device 806 in FIG. 9. The second graph is shown as cross border model 808, block 810, block 830 in FIG. 9.

At 704, the method 700 includes encoding the source dataset into respective embedding spaces based on applying the source dataset to a second neural network model. The encoding of the source dataset is shown at encoder 814 in FIG. 9.

At 706, the method 700 includes partitioning the source dataset in the respective embedding spaces into respective clusters of the second graph. The partitioning is shown at cluster 816 in FIG. 9.

In some embodiments, the plurality of transactions in the source dataset can be represented as embeddings, and the embeddings can be represented in the embedding spaces of the second graph as nodes. In some embodiments, the partitioning of the nodes in the second graph into the respective clusters can be based on the relative location of each node to the other nodes in the second graph, which can be based on the characteristics of the node (e.g., node features). That is, in some embodiments, the proximity of a node to other nodes in the second graph can be based on a similarity of the node features or vector values. In this regard, two nodes having similar features can be located relatively closer together, whereas two nodes having different features can be located relatively farther apart. For example, two nodes having different features can be located in different regions of the graph space.

In some embodiments, the partitioning of the nodes in the second graph can be based on applying one or more clustering algorithms to the data to determine the respective one or more clusters. In some embodiments, the clusters can be determined from the nodes in the second graph using centroid clustering. In some embodiments, the partitioning of the nodes using centroid clustering includes identifying one or more center nodes (e.g., centroids) and associating the other nodes in the graph to one of these center nodes to form respective groups or clusters around each center node. In some embodiments, each center node can be a random node. In other embodiments, one or more of the center nodes can be pre-determined as being representative of one of the request types. A respective group or cluster can be representative of one of the request types based on the nodes therein and the corresponding features of the nodes. For example, one or more clusters in the second graph can be representative of the first request type, whereas one or more other clusters in the second graph can be representative of the second request type.

In some embodiments, the method 700 includes determining edges between the nodes, each edge connecting a node to another node in the second graph. In some embodiments, the edges can be determined based on a respective location between the nodes. In some embodiments, the edges can be determined based on the respective features of the nodes. That is, an edge connecting two respective nodes can be determined based on a similarity between the respective embedding values. For example, two nodes can be connected by an edge based on determining a difference between the respective embedding values is below a threshold.

In some embodiments, the group of nodes forming each cluster may be determined based, at least in part, on the edges connecting the nodes in the cluster. In some embodiments, each cluster may include a central node and one or more other nodes and corresponding edges. In some embodiments, the number of one or more other nodes in the cluster may be based on the number of edges connecting each node to the central node. For example, each group may include those nodes connected with the central node by three edges or less.

In some embodiments, the method 700 can include transforming each cluster of the second graph into numeric representations. In some embodiments, transforming each cluster can include applying one or more algorithms to the group of nodes in a cluster to transform the features of the nodes into numeric representations. For example, the features can be transformed into an index sequence. In some embodiments, the method can include storing the index sequence representative of the node in a data store of a memory at the third layer. For example, the memory can be datastore 104 in FIG. 1. The transforming of each cluster is shown at block 830. The data store is shown at data store 820 in FIG. 9.

In some embodiments, transforming each cluster of the second graph into numeric representations can include identifying new centroids for the clusters in the second graph based on the initial clusters. In some embodiments, identifying the new centroids can include performing a dot product operation on the group of nodes in the cluster. In some embodiments, performing the dot product operation can include applying one or more algorithms to the features of the nodes in the cluster and determining a new center node (e.g., centroid) based on the output. In this regard, the nodes included in each cluster can be refined using the dot product operation based on the similarity of features between the nodes in the cluster. The dot product operation is shown at dot product 836 in FIG. 9.

In some embodiments, transforming each cluster of the second graph into numeric representations includes performing a sum operation on the node features from one or more nodes in a cluster. In some embodiments, the sum operation can include updating the center node with the features of the nodes in the cluster. The sum operation is shown at sum 838 in FIG. 9.

In some embodiments, transforming each cluster of the second graph into numeric representations includes performing a concatenation operation on the one or more node features in the cluster into a new vector or matrix. In some embodiments, the concatenation operation includes determining a new vector or matrix based on the features from the one or more nodes output from the sum operation. The concatenate operation is shown at concatenate 840 in FIG. 9.

In some embodiments, transforming the clusters of the second graph into numeric representations can include, applying a sum operation on the corresponding nodes in each cluster, applying a SoftMax function to the output of the sum operation for each cluster, applying a second sum operation on the output of the SoftMax function for the plurality of clusters, applying a dot product operation to the output of the second sum operation, applying the output of the dot product operation to a fully connected layer to determine new center nodes for the second graph and partitioning the nodes in the second graph to a respective center node of the new center nodes. The SoftMax function and the fully connected layer can be performed at block 830 in FIG. 9.

In some embodiments, the second graph can be determined using training data to enable identifying a request type of the transaction requests. The second request can then be applied to the second graph to classify the second request as a first request type or a second request type. In some embodiments, the second neural network model can be trained using the training data to determine the second graph and to identify each transaction request as a first request type or a second request type. In some embodiments, the second neural network model can be trained using the training data to identify each transaction request as one of a plurality of request types including the first request type and the second request type. In some embodiments, the training data can include therein transaction requests, each transaction request being labeled according to request type. In some embodiments, the training data can include therein a plurality of transaction requests, each transaction request being labeled as one of the first request type and the second request type. In some embodiments, the source dataset can include training data therein.

Figure 10:
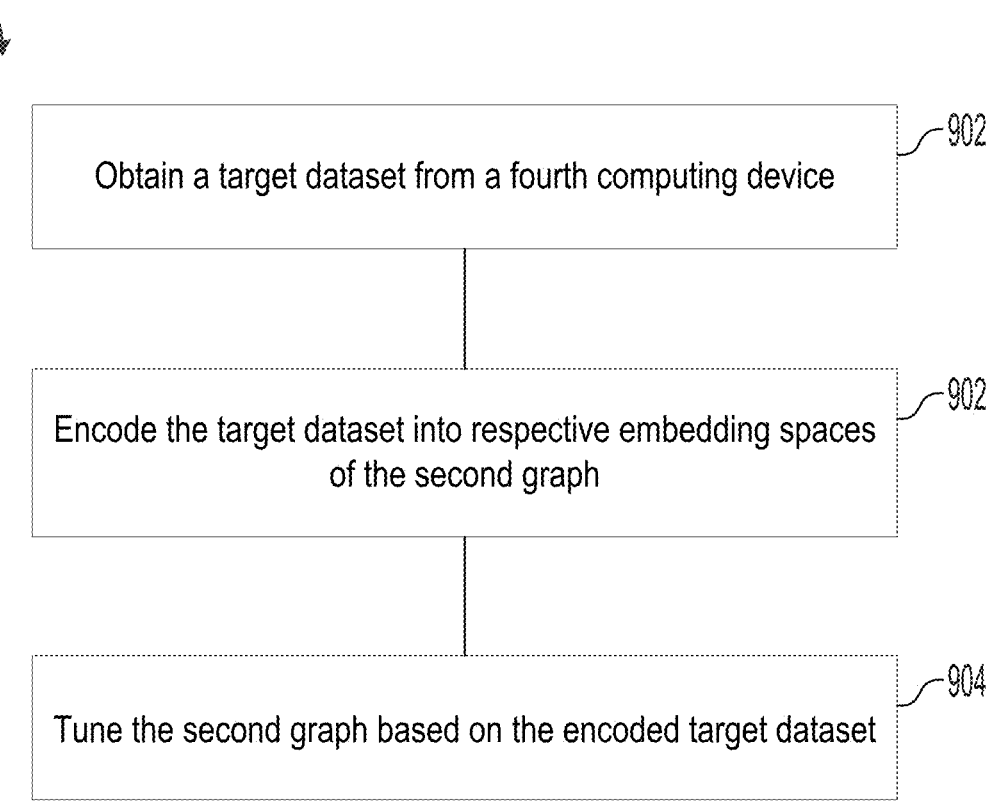
FIG. 10 is a flow diagram of a method of classifying the second request obtained from the second computing device as the first request type or the second request type based on applying data corresponding to the second request to the second graph, according to some embodiments.

FIG. 10 is a flow diagram of a method 900 of classifying the second request obtained from the second computing device as the first request type or the second request type based on applying data corresponding to the second request to the second graph, according to some embodiments. The method 900 can be an embodiment of operations 204 of the method 200 of FIG. 3. The method 900 can be an embodiment of operations 702, 704, 706 of method 700 in FIG. 8. The method 900, or one or more portions thereof, may be performed by the threat management system 102 in conjunction with datastore 104, transaction processing system 106, network 114, or any combinations thereof, and thus may be computer-implemented. In some embodiments, the method 900 can be performed by CBM module 126 in threat management system 102 of FIG. 1. In some embodiments, the system 800 can perform the method 900. The method 900 will be described in conjunction with system 800.

At 902, the method 900 includes obtaining the target dataset from a fourth computing device. In some embodiments, the fourth computing device can be a computing device of a target entity. In some embodiments, the third computing device is at a first location and the fourth computing device is at a second location, the first location being in a first jurisdiction and the second location being in a second jurisdiction. In some embodiments, the respective entities can be in a same jurisdiction or jurisdictions. In other embodiments, the respective entities can be in a different jurisdiction or jurisdictions. In yet other embodiments, the respective entities can be in one or more jurisdictions, one or more of which can be the same jurisdiction. The target dataset is shown as target data 832 in FIG. 9. As used herein, the term "jurisdiction" refers to the territory, region, province, or area under which an entity is organized, domiciled, or resident or from which its activities including electronic transactions are conducted and which has legal authority over the entity.

In some embodiments, the target dataset can be obtained at a second layer of the open transaction network to enable classifying the second request as the first request type or the second request type based on the data of the target dataset. In some embodiments, the target dataset includes therein target transaction data corresponding to the transaction requests in the source dataset. That is, each transaction request in the source dataset can include a source (e.g., third computing device) and a target (e.g., fourth computing device). In this regard, the target dataset can include target data based on the corresponding transaction request in the source dataset. For example, the transaction request can be an electronic transfer from an account associated with a user on a network of the source entity to an account associated with another user on a network of the target entity, and the target dataset can include the other user's account data to determine if the transaction request is a fraudulent transaction or an authentic transaction.

At 904, the method 900 includes encoding the target dataset into respective embedding spaces of the second graph. The encoding of the target dataset is shown at encoder 834 in FIG. 9.

In some embodiments, the one or more encoding algorithms can be applied to the target transaction data in the target dataset to determine the respective embeddings. Based on applying the one or more encoding algorithms, the target transaction data in the target dataset can be transformed into respective embeddings represented by corresponding vectors. In some embodiments, each embedding can be represented by a plurality of vectors. In some embodiments, the method includes allocating the respective embeddings (e.g., target embeddings) to respective embedding spaces of the second graph as nodes based on the corresponding vector values.

At 906, the method 900 includes tuning the second graph based on the encoded target dataset. In some embodiments, tuning the second graph can include allocating the embeddings of the target dataset as nodes into the respective embedding spaces in the second graph and into a respective cluster, and adding the features of the target dataset node to the features of the other nodes in the respective cluster. The tuning of the second graph can be performed at block 830, dot product 836, sum 838, concatenate 840 in FIG. 9.

In some embodiments, tuning the second graph based on the encoded target dataset includes performing a sum operation on the second graph and the target nodes. In some embodiments, for each respective cluster in the second graph having a target node allocated thereto, tuning the second graph based on the encoded target dataset includes performing a sum operation on the features of the nodes and the target node features to output a refined second graph. In some embodiments, the center node may include therein the concatenated features of the cluster's nodes and the features of the center node can be updated with the node features from the target node to output the refined second graph.

In some embodiments, classifying the second request obtained from the second computing device as the first request type or the second request type can include encoding the second request into embeddings including respective vector values, allocating the embeddings into the respective embedding space of the second graph, and classifying the second request as the first request type or the second request type based on the respective cluster, the classification being based on the embeddings of the second request being allocated to a respective cluster representative of the first request type or the second request type. In some embodiments, the first request type is indicative of being a fraudulent request and the second request type is indicative of being an authentic request. In some embodiments, the method further includes generating, at the third layer based on determining a request is a fraudulent request, an alert and sending the alert to the third computing devices. In some embodiments, the alert can also be sent to one or more other computing devices including, but not limited to, the fourth computing device, the second computing device, the first computing device, another computing device associated with the user, other computing devices, or any combinations thereof.

FIG. 11 is a flow diagram of a method 1000 for predicting the authenticity of the call sequence obtained from the second computing device based on the sequence threshold, according to some embodiments. The method 1000 may be an embodiment of operations 206 of the method 200 of FIG. 3. The method 1000, or one or more portions thereof, may be performed by the threat management system 102 in conjunction with datastore 104, transaction processing system 106, network 114, or any combinations thereof, and thus may be computer-implemented. In some embodiments, the method 1000 can be performed by interface module 130 in threat management system 102 of FIG. 1.

Figure 12:
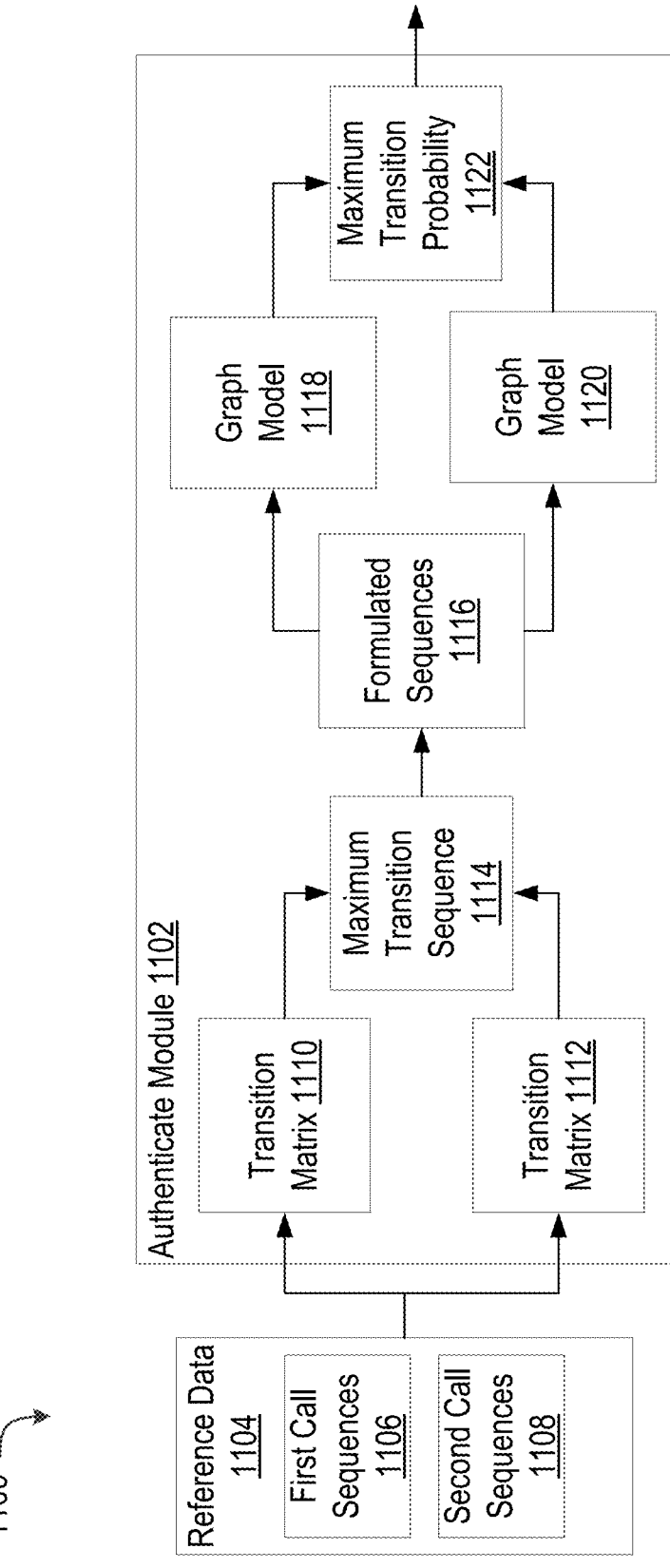
FIG. 12 is a block diagram of an example system, according to some embodiments.

FIG. 12 is a block diagram of an example system 1100, according to some embodiments. The system 1100 can perform the method 1000 in FIG. 10, according to some embodiments. The method 1000 will be described in conjunction with system 1100.

At 1002, the method 1000 includes obtaining a reference dataset corresponding to a plurality of other call sequences classified as a first call sequence type or a second call sequence type. In some embodiments, the first call sequence type can correspond to safe call sequences and the second call sequence type can correspond to malware call sequences. That is, in some embodiments, each call sequence in the plurality of other call sequences can be classified as one of a safe call sequence and a malware call sequence. It is to be appreciated that the classification of the plurality of call sequences in the reference dataset is not intended to be limited to the first call sequence type and the second call sequence type and that each call sequence can be classified based on the one or more features associated with the respective call sequence, and that the call sequences can be classified as a first call sequence type, a second call sequence type, other sequence types, or any combinations thereof. In some embodiments, the method 1000 can be performed at a third layer of the open transaction network. Referring to FIG. 12, the authenticate module is shown as authenticate module 1102, the reference dataset is shown as reference dataset 1104, the first call sequence type is shown as first call sequences 1106, the second call sequence type is shown as second call sequences 1108.

At 1004, the method 1000 includes determining, based on the reference dataset, a first sequence matrix representative of the first call sequence type and a second sequence matrix representative of the second call sequence type. In some embodiments, the first sequence matrix and the second sequence matrix can be based on a sequence chain transition matrix, as will be further described herein. The first sequence matrix is shown as transition matrix 1110 in FIG. 12. The second sequence matrix is shown as transition matrix 1112 in FIG. 12.

At 1006, the method 1000 includes determining the sequence threshold based on the first sequence matrix and the second sequence matrix. In some embodiments, the sequence threshold is a sequence threshold matrix. In some embodiments, determining the sequence threshold matrix includes performing a maximum transition sequence probability calculation for the call sequences in the first transition matrix and the second transition matrix, respectively. The sequence threshold is shown as maximum transition sequence 1114 in FIG. 12.

At 1008, the method 1000 includes determining a third graph based on the first transition matrix and determining a fourth graph based on the second transition matrix. In some embodiments, the third graph and the fourth graph can be determined by applying the first transition matrix and the second transition matrix to one or more formulated call sequences. In some embodiments, the third graph and the fourth graph can be determined by determining a maximum transition sequence probability calculation for each of the first transition matrix and the second transition matrix, and then applying the maximum transition sequence probability calculation to the formulated sequences obtained as input. In FIG. 12, the third graph is shown as graph model 1118, the fourth graph is shown as graph model 1120, and the maximum transition sequence probability calculation is shown as maximum transition probability 1122.

In some embodiments, the authenticity of the call sequence can be determined based on applying the call sequence obtained from the second computing device to the third graph and the fourth graph and based on the sequence threshold. In some embodiments, the sequence threshold can be the maximum transition sequence probability calculation. In some embodiments, based on applying the call sequence to the third graph and the fourth graph, a maximum transition sequence likelihood prediction can be determined. In some embodiments, the maximum transition likelihood prediction can be representative of a prediction of the authenticity of the call sequence as one of the first call sequence type and the second call sequence type. The prediction of the authenticity of the call sequence input to the third graph and the fourth graph is shown as an output from maximum transition probability 1122.

Figure 13:
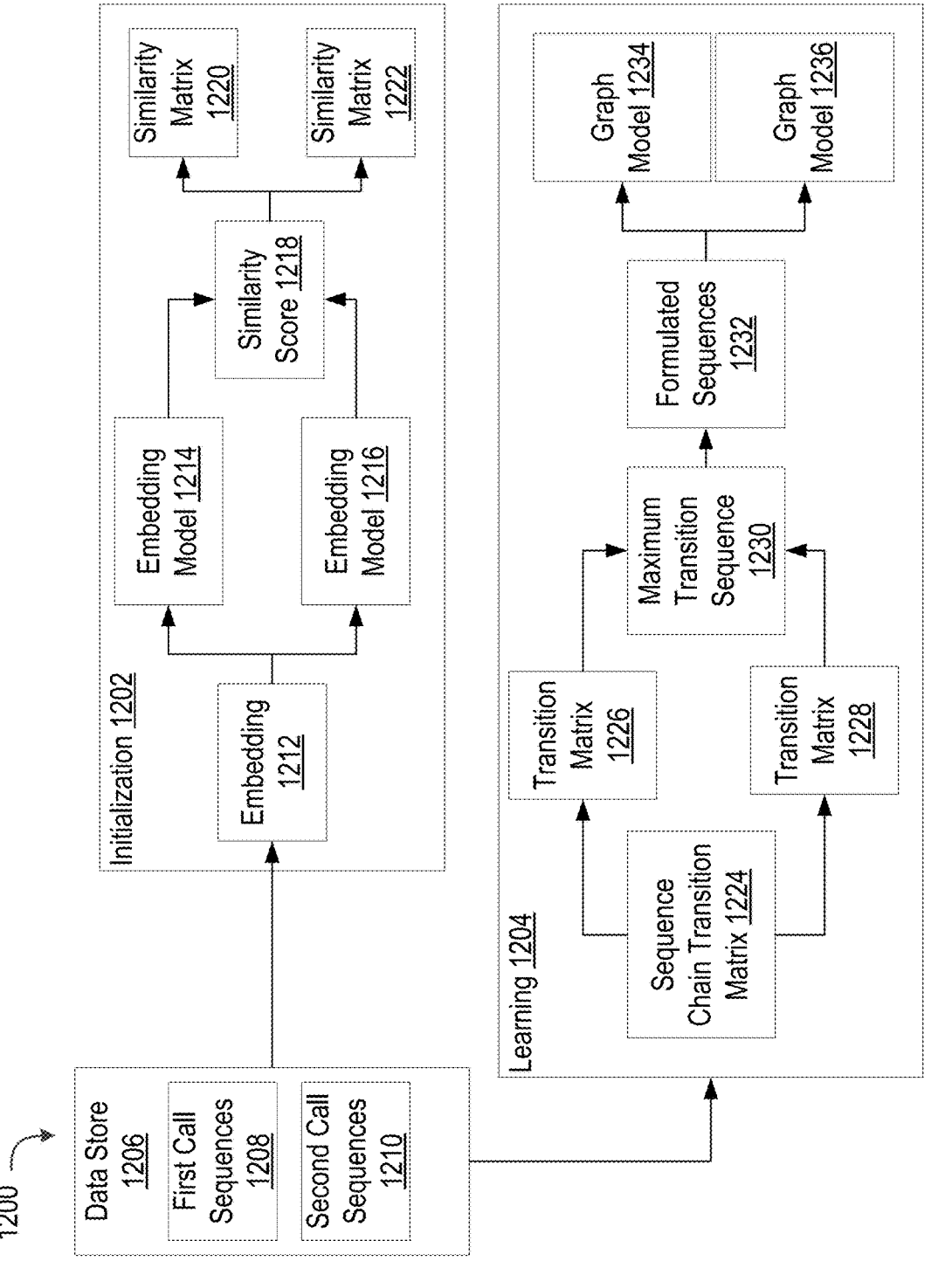
FIG. 13 is a block diagram of an example system, according to some embodiments.

FIG. 13 is a block diagram of an example system 1200, according to some embodiments. In some embodiments, the interface module 130 of threat management system 102 can include the system 1100, system 1200, or one or more portions thereof.

In some embodiments, the second request can be sent from a computing device such as third-party entity device 110 in FIG. 1 to another computing device such as entity devices 112 in FIG. 1 at a third layer. In some embodiments, the second request can be sent as an API such as, for example, API 140 in FIG. 2. In some embodiments, the call sequence corresponding to the second request can include a plurality of processing operations or processing steps that are being requested, and the call sequence can thereby include a sequence of calls where the output of one request can serve as the input of one or more other calls.

In some embodiments, the call sequence can be a chain sequence to allow for improved efficiency by minimizing a number of interactions between the computing devices and through the server or network. For example, by creating a chained call sequence, the number of interactions on network 114 in FIG. 1 can be reduced.

In some embodiments, the call sequence obtained at the third layer can be an authentic call sequence including one or more transaction requests. In other embodiments, the call sequence obtained at the third layer can be a malicious call sequence. In some embodiments, the malicious call sequence can be an authentic call sequence having one or more fraudulent call requests added to the sequence chain of the original authentic call sequence. In this regard, for example, an authentic call sequence can be intercepted from the second computing device before being obtained at the third layer and the one or more fraudulent call requests can be added to the sequence chain, and the now malicious call sequence can be sent by the computing device associated with the malicious actor to the network of the third layer. In other embodiments, the malicious call sequence can be a call sequence including therein one or more fraudulent call requests.

The system 1200 can include an initialization module 1202, a learning module 1204, and a data store 1206. The data store 1206 can include therein a reference dataset including a plurality of call sequences. The plurality of call sequences can include a first call sequence type and a second call sequence type. The first call sequence type is shown as first call sequences 1208 and the second call sequence type is shown as second call sequences 1210.

The initialization module 1202 includes embedding module 1212, first embedding model 1214, second embedding model 1216, similarity score module 1218, first similarity matrix 1220, and second similarity matrix 1222. The embedding module 1212 can obtain the reference dataset and determine one or more embeddings for each call sequence in the reference dataset. In some embodiments, the embedding module 1212 can determine one or more embeddings for each call sequence of the first call sequences 1208 and the second call sequences 1210 in the reference dataset.

Based on the embeddings determined by embedding module 1212, the initialization module 1202 can determine the first embedding model 1214 and the second embedding model 1216. In some embodiments, the first embedding model 1214 can be determined based on the embeddings of the first call sequences 1208. In some embodiments, the second embedding model 1216 can be determined based on the embeddings of the second call sequences 1210.

In some embodiments, the similarity score module 1218 can determine a similarity between the call sequences in the reference dataset based on a similarity score of the call sequences. In some embodiments, the similarity between the call sequences can be determined by the similarity score module 1218 based on the respective embeddings of the reference dataset. In some embodiments, based on the values of the embeddings for the respective call sequences in the first embedding model 1214 and second embedding model 1216, the similarity score module 1218 can determine similarity scores for each call sequences in the reference dataset.

In addition, in some embodiments, the initialization module 1202 can generate a similarity matrix for the first embedding model 1214 and second embedding model 1216 based on the similarity scores output by the similarity score module 1218. In some embodiments, the first similarity matrix 1220 can be determined based on the call sequences in the first embedding model 1214 and the corresponding similarity scores determined by the similarity score module 1218, and the second similarity matrix 1222 can be determined based on the call sequences in the second embedding model 1216 and the corresponding similarity scores determined by the similarity score module 1218.

In some embodiments, based on the first similarity matrix 1220, the initialization module 1202 can determine a first set of clusters which gives one or more first cluster sequences as output. In addition, in some embodiments, based on the second similarity matrix 1222, the initialization module 1202 can determine a second set of clusters which gives one or more second cluster sequences as output. In some embodiments, the initialization module 1202 can provide as output the first set of clusters and the second set of clusters. In some embodiments, the initialization module 1202 can provide the first set of clusters and the second set of clusters as input to the learning module 1204. In some embodiments, the first set of clusters and the second set of clusters can be stored in the data store 1206.

In some embodiments, the learning module 1204 can include sequence chain transition matrix module 1224, first transition matrix module 1226, second transition matrix module 1228, maximum transition sequence module 1230, formulated sequences module 1232, graph model module 1234 and graph model module 1236. In some embodiments, the learning module 1204 can obtain the first set of clusters and the second set of clusters as input from initialization module 1202. In other embodiments, the learning module 1204 can obtain the first set of clusters and the second set of clusters as input from the data store 1206. In some embodiments, the learning module 1204 can obtain one or more first cluster sequences as input based on the first set of clusters and the learning module 1204 can obtain one or more second cluster sequences as input based on the second set of clusters.

The sequence chain transition matrix module 1224 can determine a sequence chain transition matrix based on the sequence of calls of the one or more first cluster sequences and the one or more second cluster sequences. That is, in some embodiments, the sequence chain transition matrix module 1224 can determine a sequence chain transition matrix that describes a sequence of next possible events based on previous events in the input sequences, the input sequences including the one or more first cluster sequences and the one or more second cluster sequences. In some embodiments, the sequence chain transition matrix module 1224 can determine the sequence chain transition matrix based on the one or more first cluster sequences and the one or more second cluster sequences by applying one or more probability distribution algorithms to the cluster sequences. In other embodiments, the sequence chain transition matrix module 1224 can determine the sequence chain transition matrix based on utilizing Markov chains.

In some embodiments, the first transition matrix module 1226 of the learning module 1204 can determine the first transition matrix based on the one or more first cluster sequences and the sequence chain transition matrix output by the sequence chain transition matrix module 1224. In addition, the second transition matrix module 1228 of the learning module 1204 can determine the second transition matrix based on the one or more second cluster sequences and the sequence chain transition matrix output by the sequence chain transition matrix module 1224.

In some embodiments, the maximum transition sequence module 1230 can determine a sequence threshold based on the first transition matrix output from the first transition matrix module 1226 and the second transition matrix output from the second transition matrix module 1228. The sequence threshold can correspond to a maximum transition sequence probability calculated for the one or more first cluster sequences in the first transition matrix and calculated for the one or more second cluster sequences in the second transition matrix.

In some embodiments, the formulated sequences module 1232 of the learning module 1204 can obtain one or more formulated sequences as input. In some embodiments, the formulated sequences can correspond to call sequences for transaction requests from a plurality of second computing devices such as, for example, the third-party entity devices 110 in FIG. 1. In some embodiments, the formulated sequences obtained at the formulated sequences module 1232 can be historical call sequences obtained from a plurality of second computing devices to generate one or more graph models based on the formulated sequences obtained at the learning module 1204.

In some embodiments, the learning module 1204 can determine a sequence chain transition matrix based on the sequence chains of the formulated sequences obtained by the formulated sequences module 1232.

In some embodiments, the sequence chain transition matrix for the sequence chains of the formulated sequences can describe a sequence of next possible events based on previous events in the input sequences in the sequence chains. In some embodiments, the sequence chain transition matrix for the sequence chains of the formulated sequences can be determined based on applying the sequence threshold to the sequence chains of the formulated sequences. In some embodiments, the sequence chain transition matrix for the sequence chains of the formulated sequences can be determined based on applying one or more probability distribution algorithms to the cluster sequences of the formulated sequences. In other embodiments, the sequence chain transition matrix of the formulated sequences can be determined based on utilizing Markov chains and applying the Markov chains to the call sequences of the formulated sequences.

In some embodiments, the graph model module 1234 can determine a fourth graph model based on the sequence chain transition matrix of the formulated sequences. In some embodiments, the graph model module 1236 can determine a fifth graph model based on the sequence chain transition matrix of the formulated sequences. In some embodiments, the fourth graph model and the fifth graph model can each be further determined based on the sequence threshold. That is, in some embodiments, one or more of the formulated sequences can be determined to be the first call sequence type based on allocating the respective sequences to the fourth model and one or more other formulated sequences can be determined to be the second call sequence type based on allocating the respective sequences to the fifth model.

Figure 14:
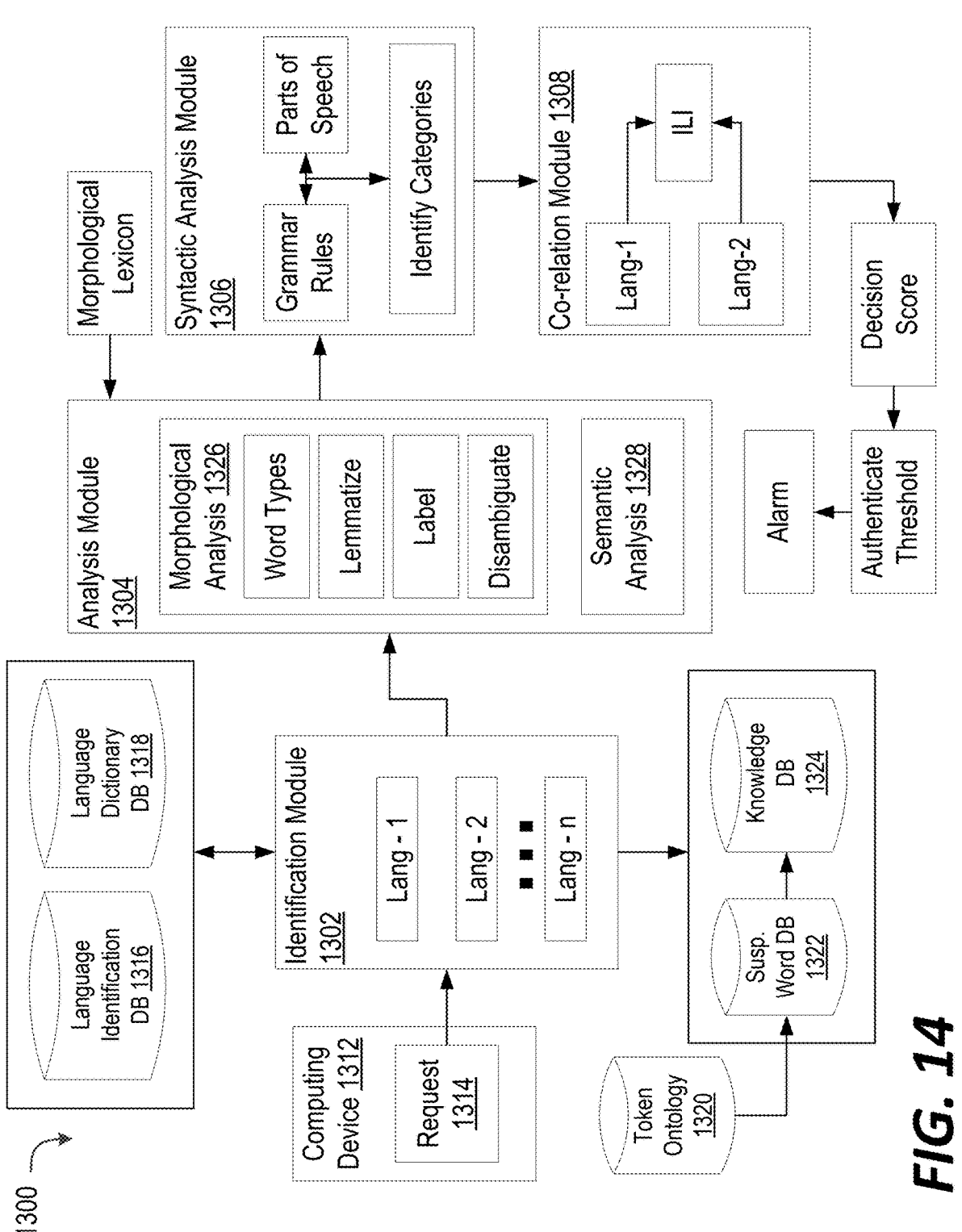
FIG. 14 is a block diagram of a system, according to some embodiments.

FIG. 14 is a block diagram of a system 1300, according to some embodiments. In some embodiments, the multi-lingual authentication module 120 can include the system 1300, or one or more portions thereof.

The system 1300 includes an identification module 1302, an analysis module 1304, a syntactic analysis module 1306, a co-relation module 1308, and a decision module 1310. Referring to FIG. 1, the threat management system 102 can obtain requests from user computing devices such as user device 108 in a network of the threat management system 102, and the threat management system 102 can utilize the multi-lingual authentication module 120 to predict an authenticity of the request and the user associated with the request based on the text of the first request.

From computing device 1312, the identification module 1302 can obtain request 1314. The identification module 1302 can identify a candidate language of the request 1314. In some embodiments, the identification module 1302 can identify one or more candidate languages based on the request 1314 that is predicted to be the language of the request 1314. For example, the request may be text data. In another example, the request may be based on audio data, which can then be transcribed into text data. In some embodiments, based on the request 1314, the identification module 1302 can identify at least a first candidate language and a second candidate language. In other embodiments, based on the request 1314, the identification module 1302 can identify a plurality of candidate languages as being similar to the language in the request 1314, the plurality of candidate languages including the first languages, the second language, one or more other languages, or any combinations thereof.

In some embodiments, the identification module 1302 can include one or more databases to enable determining the language or predicted languages of the request 1314. In some embodiments, the identification module 1302 can include a language identification database 1316 and a language dictionary database 1318. In some embodiments, the language identification database 1316 can have stored therein a plurality of different languages. In some embodiments, the language identification database 1316 can include a catalog of different languages. In some embodiments, based on the different languages stored in the language identification database 1316, the identification module 1302 can determine one or more candidate languages of the request.

In some embodiments, the language dictionary database 1318 can include therein definitions for words in the different languages included in the language identification database 1316. In some embodiments, the identification module 1302 can utilize the language identification database 1316 and the language dictionary database 1318 to analyze the words in the request and to determine one or more candidate languages of the request based on the language identification database 1316 and the language dictionary database 1318. For example, the identification module 1302 can obtain a transaction request that is in English from computing device 1312 and the identification module 1302 can identify American English and British English as two candidates.

In some embodiments, the identification module 1302 includes a token ontology database 1320, a suspicious word database 1322, and a knowledge database 1324. In some embodiments, the token ontology database 1320 can include therein data corresponding to properties of words and relationships between words. In some embodiments, the token ontology database 1320 can be utilized by the one or more functional modules of system 1300 to perform the multi-lingual authentication of the request 1314 and the user associated with the request 1314.

In some embodiments, the suspicious word database 1322 can include there one or more suspicious words. The suspicious words in the suspicious word database 1322 can be determined based on, for example, known fraudulent transaction requests. In some embodiments, the suspicious word database 1322 can be utilized by the one or more functional modules of system 1300 to perform the multi-lingual authentication of the request 1314 and the user associated with the request 1314.

In some embodiments, the knowledge database 1324 can include therein one or more known languages. In some embodiments, the knowledge database 1324 can be utilized by the one or more other components of the system 1300 to perform the multi-lingual authentication of the request 1314 and the user associated with the request 1314.

In some embodiments, the analysis module 1304 can perform a morphological analysis 1326 and/or a semantic analysis 1328 of the request 1314. In some embodiments, the morphological analysis 1326 can analyze the internal structure of the words in the request 1314 and can include identifying word types from the request 1314, lemmatizing the request 1314, labeling the request 1314, and determining a morphological disambiguation of the request 1314.

In some embodiments, the morphological analysis 1326 of the analysis module 1304 can identify word types from the text data of the request 1314. In some embodiments, the words from the text data that is identified can be certain predefined words. In some embodiments, the words can include named entities, proper names, and the like. For example, the words can include names of cities, countries, and the like.

In some embodiments, the morphological analysis 1326 of the analysis module 1304 can lemmatize the request 1314. In some embodiments, lemmatizing the request 1314 can include identifying the simplest form of one or more words in the text data of the request 1314. For example, the morphological analysis 1326 can lemmatize the word "run" from "running."

In some embodiments, the morphological analysis 1326 of the analysis module 1304 can label and extract lexemes and morphemes from the remaining words in the text data of the request 1314. As used herein, the term "lexemes" refers to a basic lexical unit of meaning of a language consisting of one or more words. For example, the words "run," "runs," "ran," and "running" are forms of the same lexeme, which correspond to "run." As used herein, the term "morphemes" refers to a meaningful morphological unit of a languages that cannot be further divided. For example, the word "incoming" is formed from "in," "come," and "-ing."

In some embodiments, the morphological analysis 1326 of the analysis module 1304 can determine the morphological disambiguation in the request 1314. As used herein, the term "morphological disambiguation" refers to determining a correct meaning of a word based on how the word is formed and used.

The analysis module 1304 can perform a semantic analysis 1328 on the request 1314. The semantic analysis 1328 can extract meaning from the text of the request 1314. In some embodiments, the semantic analysis 1328 can extract meaning from the text of the request 1314 based on the output from the morphological analysis 1326. That is, in some embodiments, based on one or more of the word types, lemmatized words, labeled words, and morphological disambiguation, the semantic analysis 1328 extract the semantic meaning of the text of the request 1314.

The syntactic analysis module 1306 can analyze the text of the request 1314 and provide the logical semantic of the text or parts of the text of the request 1314. In some embodiments, the syntactic analysis module 1306 can include grammar rules and parts-of-speech, and the syntactic analysis module 1306 can identify categories of each term in the request 1314 based on the grammar rules and the parts of speech. In some embodiments, the syntactic analysis module 1306 can obtain an output from the analysis module 1304 based on performing the morphological analysis 1326 and the semantic analysis 1328 of the text data of the request

1314 and the syntactic analysis module 1306 can identify categories of each term in the text based on the grammar rules of the language of the request 1314 and the parts of speech in the request 1314. The syntactic analysis module 1306 can analyze the text data in the request 1314 and identify one or more categories including, but not limited to, the object, subject, verbs, purpose, nouns, proper nouns, other relational categories, or any combinations thereof.

The co-relation module 1308 can analyze the request 1314 by applying the logical semantic of the text or parts of the text based of the one or more candidate languages. In some embodiments, the co-relation module 1308 can include an inter-language index. In some embodiments, the inter-language index interconnects each wordnet into a lexical database, thereby establishing a list of concepts related words using two different ontologies based on the input candidate languages. In some embodiments, based on analyzing the logical semantic of the text or parts of the text for each of the candidate languages determined at the identification module 1302 for the request 1314, the co-relation module 1308 can determine a decision score for each candidate language.

The decision module 1310 can determine, based on the decision score determined for each candidate language based on the request 1314 and based on the analysis of the request 1314 by the one or more modules identification module 1302, analysis module 1304, syntactic analysis module 1306, co-relation module 1308, or one or more portions thereof, the decision module 1310 can provide as output a prediction of the authenticity of the first request. In some embodiments, the output by the system 1300 and the decision module 1310 can be a prediction that a user of the first request is the user of the first computing device. In other embodiments, the output by the system 1300 and the decision module 1310 can be a prediction that the user providing the first request is the same user that has an account on the network of the system 1300 such as, for example, network 114 in FIG. 1.

Figure 15:
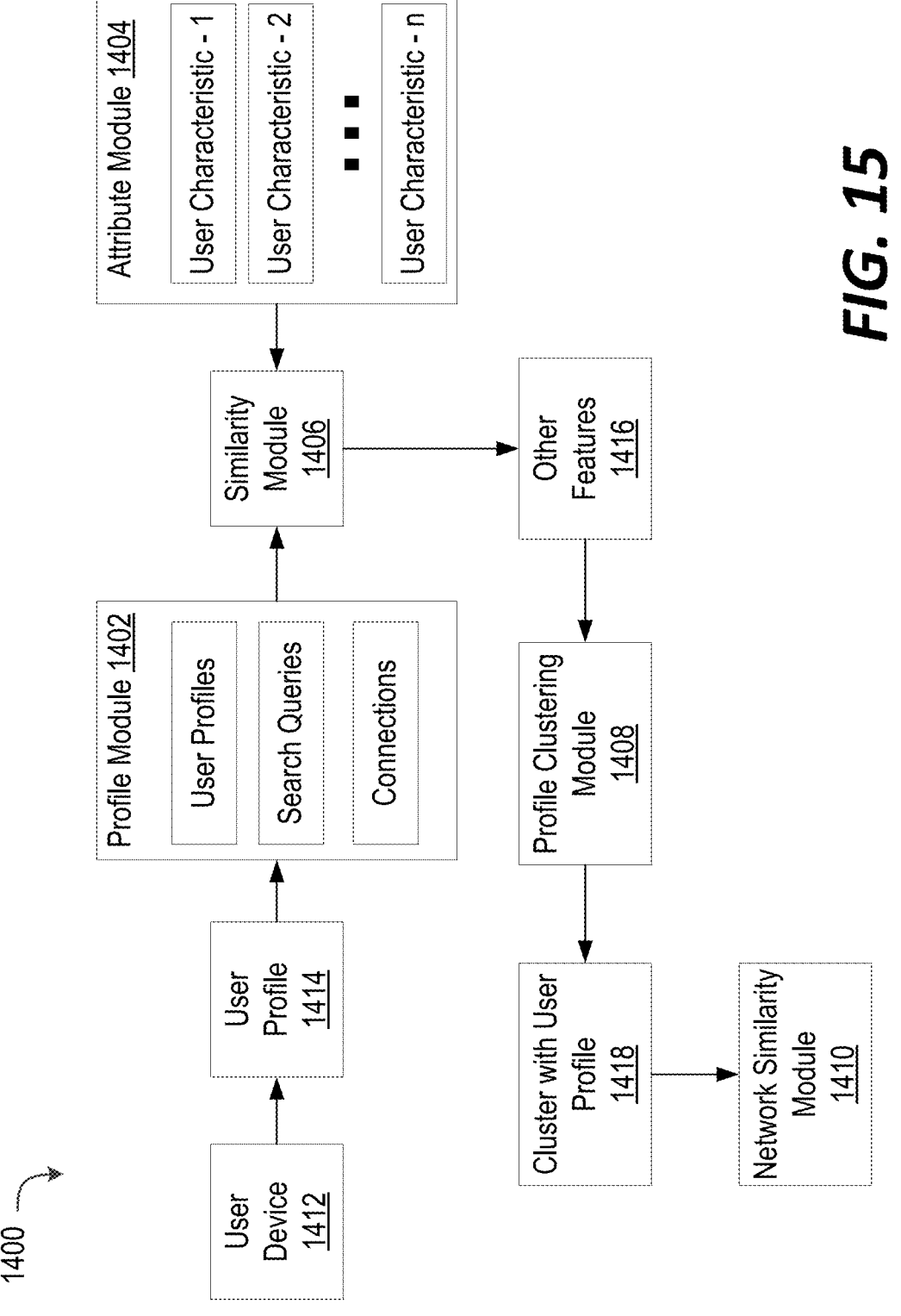
FIG. 15 is a block diagram of a system, according to some embodiments.

FIG. 15 is a block diagram of a system 1400, according to some embodiments. In some embodiments, the profile detection module 124 in threat management system 102 of FIG. 1 can include the system 1400, or one or more portions thereof. In some embodiments, the system 1400 can be applied at a first layer of an open transaction network such as, for example, network 114 of FIG. 1.

The system 1400 includes profile module 1402, attribute module 1404, similarity module 1406, profile clustering module 1408, and network similarity module 1410. In some embodiments, a user sending the first request from the users computing device 1412 can have a user profile 1414 registered on the open transaction network in order to perform and request electronic transactions with other computing devices on the network. Referring to FIG. 1, for example, the user can be associated with one of the user device 108 and can send a request to one of the third-party entity device 110 on the network 114.

In some embodiments, a request can be obtained on the network of system 1400 from device 1412. In some embodiments, to send transaction requests to the network of the system 1400, the user of device 1412 must have a profile on the network. In some embodiments, the transaction request can be a fraudulent request generated by a malicious actor using a cloned profile of a user of the network. The system 1400 can apply the one or more modules to determine if the profile associated with the request is an authentic profile of a user of the network or can determine if the profile associated with the request is a cloned profile of the user of the network. Referring to FIG. 1, fraudulent transactions can be performed using cloned profiles of users of user devices 108, third-party entity devices 110, entity devices 112, or any combinations thereof. The user profile that is being cloned can be referred to herein as a victim profile.

The profile module 1402 can extract one or more features from a user's profile. In some embodiments, a victim profile and a cloned profile can be associated with a certain user of the network of system 1400. In some embodiments, the profile module 1402 can extract one or more features from the victim profile. In some embodiments, the profile module 1402 can extract one or more features from the cloned profile. In other embodiments, the profile module 1402 can extract one or more respective features from the cloned profile and the victim profile. In some embodiments, the user associated with the victim profile can have one or more other user accounts and the profile module 1402 can extract features from those other user accounts as well to perform the cloned profile detection.

In some embodiments, the profile module 1402 can, based on user data from at least one of the cloned profile and the victim profile, extract features from other profiles associated with the user. In some embodiments, the profile module 1402 can query external networks associated with other entities for online electronic profiles associated with the user of the victim profile and the cloned profile. For example, the profile module 1402 can query data from one or more social media profiles associated with the user.

In some embodiments, in response to obtaining a request, the profile module 1402 can perform a search query for profiles associated with the user of the request on the network. In some embodiments, the request can be associated with user profile 1414 and the profile module 1402 can search for any other profiles on the network that may be associated with the user of user profile 1414 based on the profile data. In some embodiments, the user profile 1414 can be the victim's profile. In other embodiments, the user profile 1414 can be a cloned profile of the victim's profile, and the profile module 1402 can search and extract one or more features from the user profile 1414 that can be cloned from the victims' profile.

In some embodiments, the profile module 1402 can search the user profile 1414 and identify one or more other users having connections with the user profile 1414. In some embodiments, the one or more other users can be determined based on the user data. In some embodiments, the one or more other users can be determined based on historical data. In some embodiments, the one or more other users can be users having sent or received processing transaction requests with user profile 1414. In some embodiments, the one or more other users can be determined based on one or more inputs from the user of user profile 1414. For example, the one or more other users can be identified as "friends" with the user on the user profile 1414. It is to be appreciated that the methods for connecting the user profiles with the one or more other user profiles is not intended to be limiting and the respective profiles can be connected using any of a plurality of features associated with the user profile 1414 and the user profiles of the other users. For example, the one or more other user profiles can be determined based on location data of the device 1412.

The attribute module 1404 can determine one or more inferences based on one or more characteristics of the request from device 1412, the user profile 1414, other data, or any combinations thereof. In some embodiments, the attribute module 1404 can determine one or more inferences based on the text data of the request from device 1412. In some embodiments, the attribute module 1404 can make one or more inferences based on one or more first characteristics, one or more second characteristics, one or more third characteristics, other characteristics, or any combinations thereof.

In some embodiments, the attribute module 1404 can make one or more inferences based on one or more first characteristics. In some embodiments, the one or more first characteristics can be based on user behavior. In some embodiments, the one or more first characteristics can be based on a similarity of user behavior determined based on the extracted features from the victim profile. In some embodiments, the one or more first characteristics can be based on a similarity of user behavior determined based on the extracted features from the cloned profile and the victim profile. In some embodiments, the one or more first characteristics can include a profile score determined based on the extracted features from at least one of the cloned profile, the victim profile, or both. For example, the profile score can be a prediction of a likelihood that the profile is the authentic profile associated with the user based on features extracted from the profile or profiles. In some embodiments, the one or more first characteristics can include an intention score determined based on the extracted features from at least one of the cloned profile, the victim profile, or both. For example, the intention score can be a value representative of whether the intention of the request and/or the user profile 1414 associated with the request is for a legitimate purpose or a fraudulent purpose based on the extracted features from the profile or profiles. In some embodiments, the one or more first characteristics can be a behavior similarity score.

In some embodiments, the attribute module 1404 can make one or more inferences based on one or more second characteristics. In some embodiments, the one or more second characteristics can be based on an attitude of the user associated with the request from device 1412 and user profile 1414. For example, the one or more second characteristics can be utilized by the attribute module 1404 to infer an emotional attitude of the user of the user profile 1414 including identifying, but not limited to, the user's confidence, positivity, negativity, frustration, other attitudes, or any combinations thereof based on, for example, the request of the user associated with user profile 1414 obtained by the system 1400.

In some embodiments, the attribute module 1404 can make one or more inferences based on one or more third characteristics. In some embodiments, the one or more third characteristics can be determined based on one or more inputs including, but not limited to, the request and/or the extracted features from user profile 1414. For example, the one or more third characteristics can be utilized by the attribute module 1404 to infer one or more traits of the user associated with the user profile 1414 including, but not limited to, social withdrawal, distractibility, stress tolerance, other traits, or any combinations thereof.

The similarity module 1406 can determine a similarity between the one or more features extracted by the profile module 1402 and the one or more attributes or characteristics determined by the attribute module 1404.

In some embodiments, the clustering module 1408 can encode the features extracted by the profile module 1402 into one or more clusters of a graph. In some embodiments, the clustering module 1408 can also encode the one or more characteristics determined by the profile module 1402 into one or more clusters of the graph. In some embodiments, one or more other features 1416 can be determined for the user profile 1414 including, but not limited to, friends, followers, group count, other features, or any combinations thereof. In some embodiments, the one or more other features can also be encoded by the clustering module 1408 into the one or more clusters of the graph.

In some embodiments, the clustering module 1408 can obtain the one or more other profiles associated with the user of the user profile 1414 on the network and can cluster the features extracted from these other profiles. In some embodiments, the user profile 1414 can be a cloned profile and the clustering module 1408 can obtain the features from the victim profile on the network and cluster the features of the victim's profile with the features extracted by the profile module 1402, attribute module 1404, the other features 1416, or any combinations thereof. In some embodiments, the profile module 1402 can extract the features from the victim's profile for clustering by the clustering module 1408.

The network similarity module 1410 can obtain the clusters of the profile or profiles and can compare the attributes of the real profile with the attributes of the cloned profile using one or more different methodologies. In some embodiments, based on the comparison of the attributes, the network similarity module 1410 can classify the cluster of the user profile 1414 as a real profile or a cloned profile. In some embodiments, the network similarity module 1410 can also classify the cluster of the victim's profile as the real profile or the cloned profile based on the comparison of the attributes. In some embodiments, the network similarity module 1410 can, based on the attributes and the comparison, can validate the user profile 1414 as one of the real profile or the cloned profile.

Figure 16:
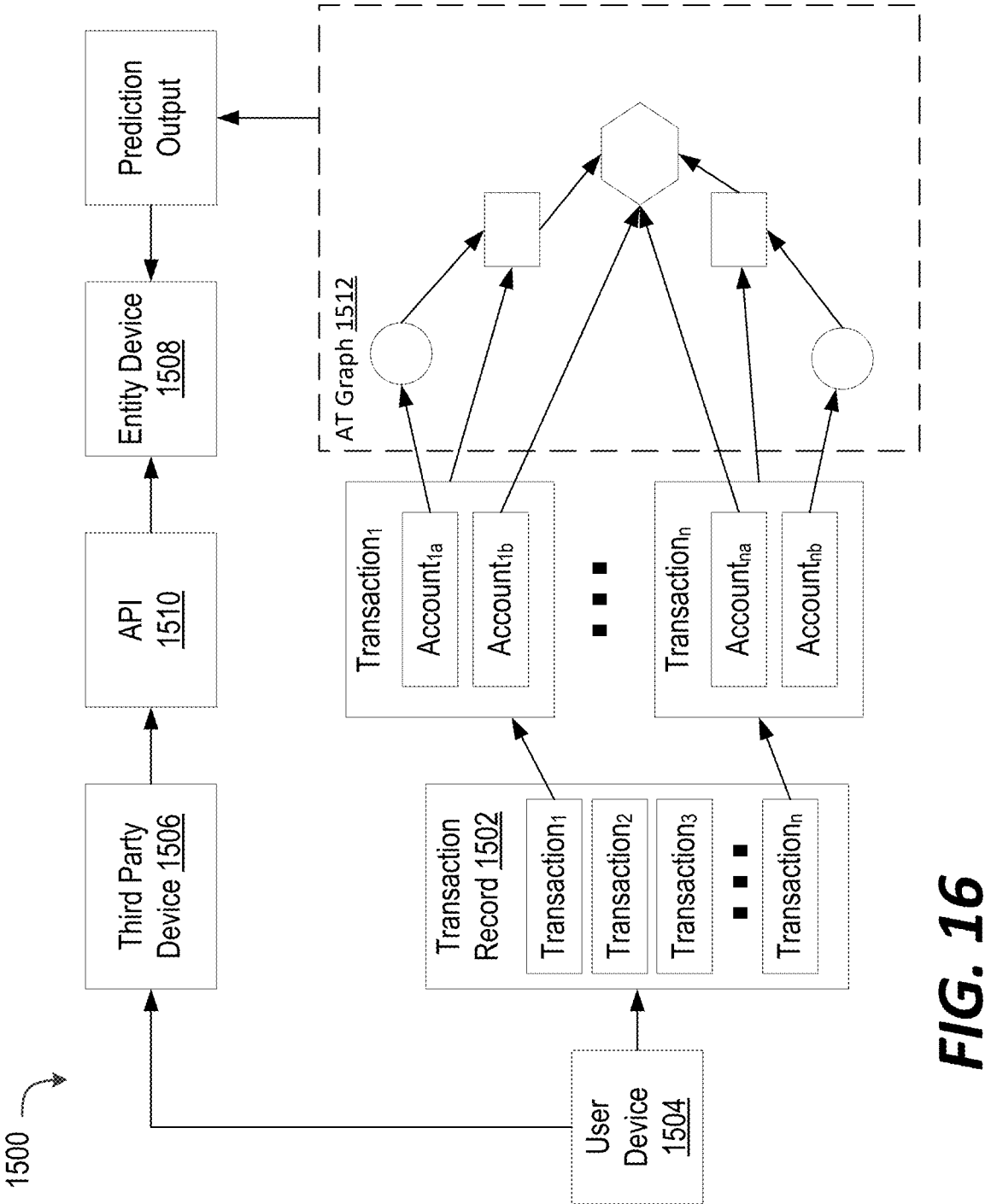
FIG. 16 is a block diagram of a system, according to some embodiments.

FIG. 16 is a block diagram of a system 1500, according to some embodiments. In some embodiments, the transaction monitor module 128 can include the system 1500, or one or more portions thereof. In some embodiments, the transaction monitor module 128 and the system 1500 can be at a second layer such as layer 144 in FIG. 2.

The system 1500 can monitor transactions that flow between user devices and third-party devices, and between the third-party devices and the entity devices using APIs. In some embodiments, the system 1500 can include transaction record 1502 logging the electronic transactions performed for each respective user of the network of the system 1500, and which flows between the third-party services and the entities.

The system 1500 can monitor the electronic transactions for user devices such as user device 1504 on the network of the system 1500. In some embodiments, the transaction record 1502 can log the transactions from the user device 1504 to the third-party devices including third-party device 1506. In some embodiments, the transactions logged at the transaction record 1502 can be for performing electronic transactions between one or more other computing devices. In some embodiments, the one or more other computing devices can include entity device 1508. In some embodiments, the entity device 1508 can be a source entity and the one or more other computing devices can also include another entity device (not shown) which is associated with a target entity.

The system 1500 can maintain a transaction record such as transaction record 1502 for each user device performing transactions on the network of system 1500. The transaction record 1502 includes therein transaction records from user device 1504. Referring to FIG. 16, in some embodiments, the transaction record 1502 includes transaction$_1$, transaction$_2$, transaction$_3$, and through transaction$_n$. In some embodiments, the transaction record 1502 can include therein all the transactions associated with the user device 1504. In some embodiments, the transaction record 1502 can include therein transactions associated with the user device 1504 during a certain time period.

Each transaction in transaction record 1502 can have associated therewith one or more attributes. In some embodiments, the attributes can include account data. In some embodiments, the attributes can also include timestamp data. In other embodiments, the attributes can include other data associated with the respective transaction, user device 1504, third-party device 1506, entity device 1508, API 1510, other attributes, or any combinations thereof. As shown in FIG. 16, each of the transactions, e.g., transaction$_1$ through transaction$_n$, has associated therewith account data and timestamp data as a value. In some embodiments, the account data can include a source account and a target account. In some embodiments, the source account can be associated with the entity of entity device 1508. In some embodiments, the target account can also be associated with the entity of entity device 1508. In other embodiments, the target account can be associated with another entity of another entity device.

In some embodiments, the system 1500 can perform the transaction monitoring for the user devices performing transactions on the network of system 1500 using AT graphs. In some embodiments, the system 1500 can include AT graph 1512. In some embodiments, the AT graph 1512 can be generated based on the transactions in the transaction record 1502 and from user device 1504.

In some embodiments, the AT graph 1512 can include an account node 1514 for each transaction in the transaction record 1502. Each account node 1514 can be connected with a corresponding transaction node 1516 associated with the respective transaction. In some embodiments, each account node 1514 can have associated therewith one or more attributes including the account information from the respective transaction in the transaction record 1502. In some embodiments, the account information is the account information of the user of user device 1504. As shown in FIG. 16, the AT graph 1512 includes account node 1514a through account node 1514n.

In some embodiments, the AT graph 1512 can include a transaction node 1516 for each transaction in transaction record 1502. In some embodiments, the transaction node 1516 can be connected with the corresponding account node 1514 associated with the respective transaction and can also be connected with the target account node 1518 through edges. In some embodiments, each transaction node 1516 can have associated therewith one or more attributes including the timestamp value from the respective transaction in the transaction record 1502. As shown in FIG. 16, the AT graph 1512 includes transaction node 1516a through transaction node 1516n.

In some embodiments, the AT graph 1512 can include a target account node 1518. The target account node 1518 can include information from each of the transactions of the transaction record 1502. In some embodiments, the target account node 1518 can have associated therewith one or more attributes including the target account information. In some embodiments, the target account node 1518 can be connected to each of the transaction nodes 1516 in the AT graph 1512 through edges.

In some embodiments, the user device 1504 can send a plurality of transaction requests to third-party device 1506, and one or more of the transaction requests can be associated with entity device 1508. In some embodiments, for the one or more transaction requests, the entity device 1508 can be the source entity or the target entity and another computing device of another entity can be the other of the source entity and the target entity. In other embodiments, the entity device 1508 can be both the source entity and the target entity.

In addition, in some embodiments, for each transaction in the transaction record 1502 involving a certain entity device such as, for example, entity device 1508, the AT graph 1512 can include a corresponding target account node 1518 associated with the entity device 1508. In some embodiments, one or more of the transactions in transaction record 1502 can include the entity device 1508 as one of the source entity and the target entity. Accordingly, the target account node 1518 associated with entity device 1508 in AT graph 1512 includes the information from these transactions. In some embodiments, the target account node 1518 can have associated therewith one or more attributes corresponding to account data from the one or more transactions in the transaction record 1502.

The AT graph 1512 can be utilized to monitor for valid transactions and invalid transactions. For a certain user device such as, for example, user device 1504, each of the transaction associated with user device 1504 can be monitored at the system 1500 to determine if each transaction is a valid or invalid transaction. In some embodiments, a determine of whether a transaction is a valid or invalid transaction can be based on performing a comparison between the features of the respective transaction in the transaction record 1502 and the attributes of the corresponding account node 1514, transaction node 1516, and target account node 1518 in the AT graph 1512. In some embodiments, a transaction may be determined to be invalid based on one or more attributes of the account node 1514, transaction node 1516, and the target account node 1518 failing to match with the data corresponding to the respective transaction in the transaction record 1502. In other embodiments, the transaction may be determined to be invalid based on the respective transaction in the transaction record 1502 failing to match with the attributes of at least one of the account node 1514, transaction node 1516, and target account node 1518 in the AT graph 1512.

Figure 17:
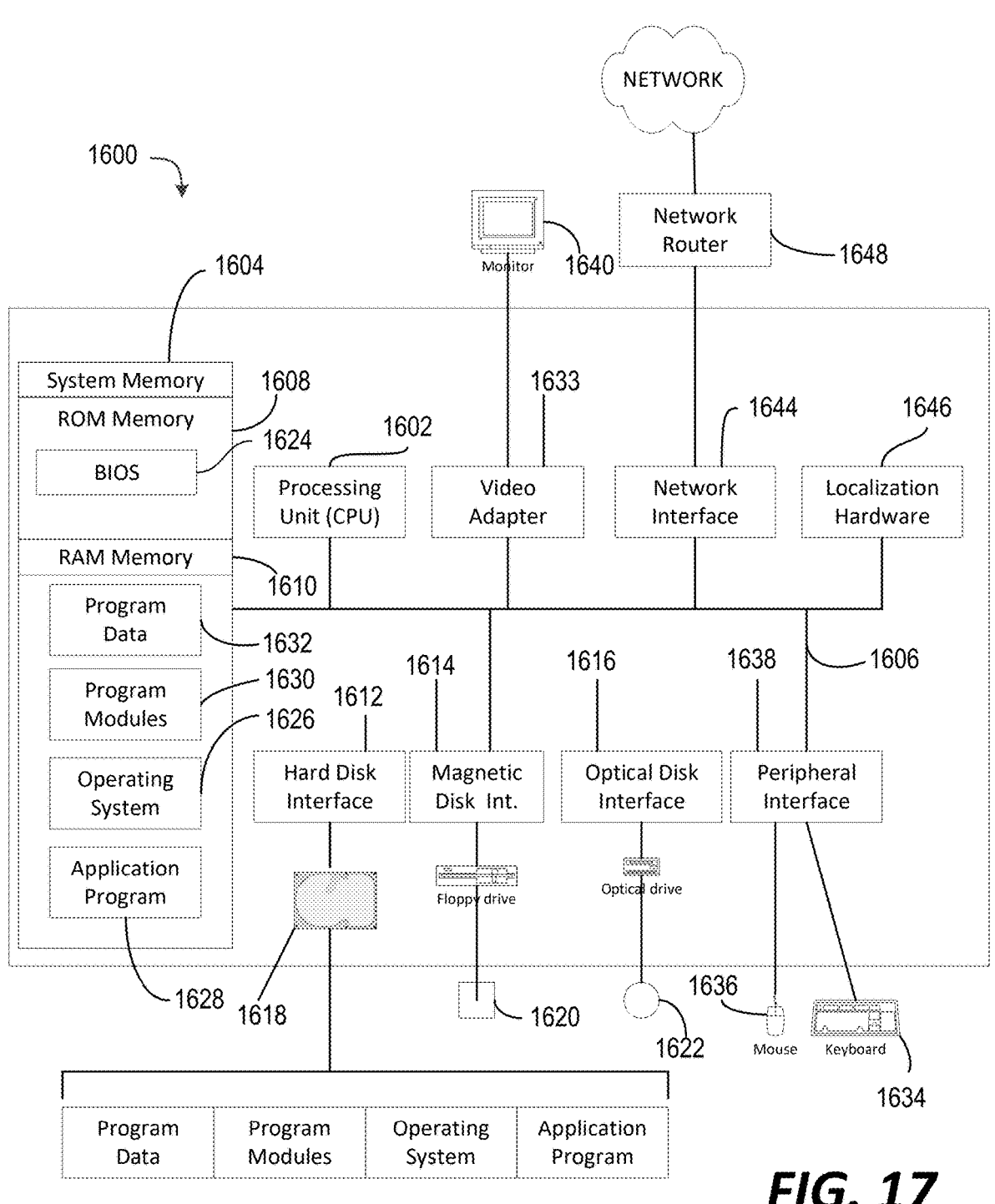
FIG. 17 is a block diagram of an example computing system, according to some embodiments.

FIG. 17 is a block diagram of an example computing system 1600, such as a desktop computer, laptop, smartphone, tablet, or any other such device having the ability to execute instructions, such as those stored within a nontransient, computer-readable medium. Furthermore, while described and illustrated in the context of a single computing system 1600, those skilled in the art will also appreciate that the various tasks described hereinafter may be practiced in a distributed environment having multiple computing systems 1600 linked via a local or wide-area network in which the executable instructions may be associated with and/or executed by one or more of multiple computing systems 1600.

In its most basic configuration, computing system environment 1600 typically includes at least one processing unit 1602 and at least one memory 1604, which may be linked via a bus 1606. Depending on the exact configuration and type of computing system environment, memory 1604 may be volatile (such as RAM 1610), non-volatile (such as ROM 1608, flash memory, etc.) or some combination of the two. Computing system environment 1600 may have additional features and/or functionality. For example, computing system environment 1600 may also include additional storage (removable and/or non-removable) including, but not limited to, magnetic or optical disks, tape drives and/or flash drives. Such additional memory devices may be made accessible to the computing system environment 1600 by means of, for example, a hard disk drive interface 1612, a magnetic disk drive interface 1614, and/or an optical disk drive interface 1616. As will be understood, these devices, which would be linked to the system bus 1606, respectively, allow for reading from and writing to a hard disk 1618, reading from or writing to a removable magnetic disk 1620, and/or for reading from or writing to a removable optical disk 1622, such as a CD/DVD ROM or other optical media. The drive interfaces and their associated computer-readable media allow for the nonvolatile storage of computer readable instructions, data structures, program modules and other data for the computing system environment 1600. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 1600.

A number of program modules may be stored in one or more of the memory/media devices. For example, a basic input/output system (BIOS) 1624, containing the basic routines that help to transfer information between elements within the computing system environment 1600, such as during start-up, may be stored in ROM 1608. Similarly, RAM 1610, hard drive 1618, and/or peripheral memory devices may be used to store computer executable instructions comprising an operating system 1626, one or more applications programs 1628, other program modules 1630, and/or program data 1632. Still further, computer-executable instructions may be downloaded to the computing environment 1600 as needed, for example, via a network connection. The applications programs 1628 may include, for example, a browser, including a particular browser application and version, which browser application and version may be relevant to determinations of correspondence between communications and user URL requests, as described herein. Similarly, the operating system 1626 and its version may be relevant to determinations of correspondence between communications and user URL requests, as described herein.

An end-user may enter commands and information into the computing system environment 1600 through input devices such as a keyboard 1634 and/or a pointing device 1636. While not illustrated, other input devices may include a microphone, a joystick, a game pad, a scanner, etc. These and other input devices would typically be connected to the processing unit 1602 by means of a peripheral interface 1638 which, in turn, would be coupled to bus 1606. Input devices may be directly or indirectly connected to processor 1602 via interfaces such as, for example, a parallel port, game port, firewire, or a universal serial bus (USB). To view information from the computing system environment 1600, a monitor 1640 or other type of display device may also be connected to bus 1606 via an interface, such as via video adapter 1633. In addition to the monitor 1640, the computing system environment 1600 may also include other peripheral output devices, not shown, such as speakers and printers.

The computing system environment 1600 may also utilize logical connections to one or more computing system environments. Communications between the computing system environment 1600 and the remote computing system environment may be exchanged via a further processing device, such a network router 1648, that is responsible for network routing. Communications with the network router 1648 may be performed via a network interface component 1644. Thus, within such a networked environment, e.g., the Internet, World Wide Web, LAN, or other like type of wired or wireless network, it will be appreciated that program modules depicted relative to the computing system environment 1600, or portions thereof, may be stored in the memory storage device(s) of the computing system environment 1600.

The computing system environment 1600 may also include localization hardware 1646 for determining a location of the computing system environment 1600. In embodiments, the localization hardware 1646 may include, for example only, a GPS antenna, an RFID chip or reader, a WiFi antenna, or other computing hardware that may be used to capture or transmit signals that may be used to determine the location of the computing system environment 1600. Data from the localization hardware 1646 may be included in a callback request or other user computing device metadata in the methods of this disclosure.

The computing system, or one or more portions thereof, may embody a user computing device 108, in some embodiments. Additionally, or alternatively, some components of the computing system 1600 may embody the threat management system 102 and/or transaction processing system 106. For example, the functional modules 120, 122, 124, 126, 128, 130, 150 may be embodied as program modules 1330.

In some embodiments, a system includes a processor, and a non-transitory computer readable medium having stored thereon instructions that are executable by the processor to cause the system to perform operations including apply, by the system at a first layer, data corresponding to a first request obtained from a first computing device to a first graph to determine one or more first embeddings and one or more second embeddings, classify, by the system at a second layer, a second request obtained from a second computing device as a first request type or a second request type based on applying data corresponding to the second request to a second graph, predict, by the system at a third layer, an authenticity of a call sequence obtained from the second computing device based on a sequence threshold, and send, by the system, the call sequence to a third computing device as output based on authenticating the call sequence.

In some embodiments, the first request corresponding to a first processing transaction to be performed by the second computing device.

In some embodiments, applying data corresponding to the first request obtained from the first computing device to the first graph to determine the one or more first embeddings and the one or more second embeddings further including obtain, by the system at the first layer, the first request from the first computing device, extract, by the system at the first layer, the first graph from a global graph, and send, by the system, the one or more first embeddings and the one or more second embeddings to the second computing device. In some embodiments, the first graph includes one or more nodes extracted from the global graph based on user data in the first request.

In some embodiments, applying data corresponding to the first request obtained from the first computing device to the first graph to determine the one or more first embeddings and the one or more second embeddings further including obtain, by the system at the first layer, a global data corresponding to user data from a plurality of first computing devices, and determine, by the system at the first layer, the global graph based on classifying the global data. In some embodiments, the global data including a first data type and a second data type.

In some embodiments, determining the global graph based on classifying the global data further including allocate, by the system at the first layer, nodes representative of the global data to respective embedding spaces in the global graph, classify, by the system at the first layer, the global data as the first data type or the second data type, and partition, by the system at the first layer, the nodes into a plurality of clusters based on classifying the global data as one of the first data type and the second data type. In some embodiments, the plurality of clusters including one or more first clusters representative of the first data type and one or more second clusters representative of the second data type.

In some embodiments, the one or more first embeddings corresponding to non-sensitive data associated with a user of the first computing device, and the one or more second embeddings corresponding to encrypted tokenized sensitive data associated with the user of the first computing device.

In some embodiments, the second request corresponding to a second processing transaction to be performed by the third computing device, and the second request including the one or more first embeddings and the one or more second embeddings of the first request.

In some embodiments, classifying the second request obtained from the second computing device as the first request type or the second request type based on applying data corresponding to the second request to a second graph further including obtain, by the system at the second layer, a source dataset including a plurality of requests from the third computing device, encode, by the system at the second layer, the source dataset into respective embedding spaces of the second graph, and partition, by the system at the second layer, the source dataset in the respective embedding spaces into respective clusters of the second graph. In some embodiments, the second request is classified as one of the first request type and the second request type based on encoding the data corresponding to the second request into one of the respective clusters in the second graph.

In some embodiments, classifying the second request obtained from the second computing device as the first request type or the second request type based on applying data corresponding to the second request to a second graph further including obtain, by the system at the second layer, a target dataset from a fourth computing device, encode, by the system at the second layer, the target dataset into respective embedding spaces of the second graph, and tune, by the system at the second layer, the second graph based on the encoded target dataset. In some embodiments, the tuning including concatenating vectors associated with respective embeddings of the source dataset with vectors associated with respective embeddings of the target dataset. In some embodiments, the first request type is indicative of a fraudulent request and the second request type is indicative of a non-fraudulent request.

In some embodiments, predicting the authenticity of the call sequence obtained from the second computing device based on the sequence threshold further including obtain, by the system at the third layer, a reference dataset corresponding to corresponding to a plurality of other call sequences classified as a first call sequence type or a second call sequence type, determine, by the system at the third layer, based on the reference dataset, a first sequence matrix representative of the first call sequence type and a second sequence matrix representative of the second call sequence type, determine, by the system at the third layer, the sequence threshold based on the first sequence matrix and the second sequence matrix, and determine, by the system at the third layer, a third graph based on the first sequence matrix and a fourth graph based on the second sequence matrix. In some embodiments, the authenticity of the call sequence is determined based on applying the call sequence to the third graph and the fourth graph and based on the sequence threshold.

In some embodiments, a method for performing threat monitoring at one or more network layers, the method including applying, at a first layer, data corresponding to a first request obtained from a first computing device to a first graph to determine one or more first embeddings and one or more second embeddings, classifying, at a second layer, a second request obtained from a second computing device as a first request type or a second request type based on applying data corresponding to the second request to a second graph, sending a call sequence to a third computing device as output based on authenticating the call sequence. In some embodiments, the first request corresponds to one or more processing transactions to be performed by the second computing device. In some embodiments, the one or more first embeddings corresponds to non-sensitive data of a user associated with the first computing device, and the one or more second embeddings corresponds to encrypted tokenized sensitive data of the user associated with the first computing device.

In some embodiments, classifying the second request obtained from the second computing device as the first request type or the second request type based on partitioning data corresponding to the second request to the second graph further including obtaining, at the second layer, a source dataset including a plurality of requests from the third computing device, encoding, at the second layer, the source dataset into respective embedding spaces of the second graph, and partitioning, at the second layer, the source dataset in the respective embedding spaces into respective clusters of the second graph. In some embodiments, the second request is classified as one of the first request type and the second request type based on encoding the data corresponding to the second request into one of the respective clusters in the second graph.

In some embodiments, classifying the second request obtained from the second computing device as the first request type or the second request type based on partitioning data corresponding to the second request to the second graph further including obtaining, at the second layer, a target dataset from a fourth computing device, encoding, at the second layer, the target dataset into respective embedding spaces of the second graph, and tuning, at the second layer, the second graph based on the encoded target dataset.

In some embodiments, the tuning including concatenating vectors associated with the respective embeddings of the source dataset with the vectors associated with the respective embeddings of the target dataset.

In some embodiments, the second request including data corresponding to one or more processing transactions to be performed by the third computing device and the fourth computing device based on the first request.

In some embodiments, the second request further including the one or more first embeddings and the one or more second embeddings.

In some embodiments, a non-transitory computer readable media having stored thereon instructions executable by a processor to cause the processor to perform operations including apply, at a first layer, data corresponding to a first request obtained from a first computing device to a first graph to determine one or more first embeddings and one or more second embeddings, classify, at a second layer, a second request obtained from a second computing device as a fraudulent request or an authentic request based on applying data corresponding to the second request to a second graph, predict, at a third layer, an authenticity of a call sequence obtained from the second computing device based on a sequence threshold, send, from the third layer, the call sequence to a third computing device as output based on authenticating the call sequence. In some embodiments, the first request corresponds to one or more processing transactions to be performed by the second computing device. In some embodiments, the one or more first embeddings corresponds to non-sensitive data of a user associated with the first computing device, and the one or more second embeddings corresponds to encrypted sensitive data of the user associated with the first computing device.

In some embodiments, applying data corresponding to the first request obtained from the first computing device to the first graph to determine the one or more first embeddings and the one or more second embeddings further including obtain, at the first layer, data corresponding to the first request from the first computing device, obtain, at the first layer, a global data corresponding to user data from a plurality of first computing devices, classify, at the first layer, the global data as one of a first data type and a second data type, determine, at the first layer, a global graph based on classifying the global data, extract, at the first layer, the first graph from the global graph based on the first request, send, from the first layer, the one or more first embeddings and the one or more second embeddings to the second computing device. In some embodiments, the first graph including one or more nodes extracted from the global graph based on user data in the first request. In some embodiments, the global data including the first data type and the second data type. In some embodiments, the first graph includes one or more clusters representative of the first data type and one or more other clusters representative of the second data type.

In some embodiments, determining the global graph based on the classifying the global data further including determine, at the first layer, a plurality of first nodes in the global graph corresponding to non-sensitive data, and determine, at the first layer, a plurality of second nodes in the global graph corresponding to sensitive data. In some embodiments, the first graph includes one or more nodes of the plurality of first nodes and one or more nodes of the plurality of second nodes extracted from the global graph based on the first request.

In some embodiments, predicting the authenticity of the call sequence obtained from the second computing device based on the sequence threshold further including obtain, at the third layer, a reference dataset corresponding to corresponding to a plurality of other call sequences classified as a first call sequence type or a second call sequence type, determine, at the third layer, based on the reference dataset, a first sequence matrix representative of the first call sequence type and a second sequence matrix representative of the second call sequence type, determine, at the third layer, the sequence threshold based on the first sequence matrix and the second sequence matrix, and determine, at the third layer, a third graph based on the first sequence matrix and a fourth graph based on the second sequence matrix. In some embodiments, the authenticity of the call sequence is determined based on applying the call sequence to the third graph and the fourth graph and based on the sequence threshold.

All prior patents and publications referenced herein are incorporated by reference in their entireties.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

What is claimed is:

1. A system comprising:

a processor; and a non-transitory computer readable medium having stored thereon instructions that are executable by the processor to cause the system to perform operations comprising:

obtain, by the system at a first layer, a global data corresponding to user data from a plurality of first computing devices, the global data including a first data type and a second data type, determine, by the system at the first layer, a global graph based on classifying the global data, extract, by the system at the first layer, a first graph from the global graph, the first graph comprising one or more nodes extracted from the global graph based on a first request, apply, by the system at the first layer, data corresponding to the first request obtained from a first computing device to a first graph to determine one or more first embeddings and one or more second embeddings, classify, by the system at a second layer, a second request obtained from a second computing device as a first request type or a second request type based on applying data corresponding to the second request to a second graph, wherein the second request is based on the one or more first embeddings and the one or more second embeddings;

predict, by the system at a third layer, an authenticity of a call sequence obtained from the second computing device based on a sequence threshold, and send, by the system, the call sequence to a third computing device as output based on authenticating the call sequence.

2. The system of claim 1, wherein the first request corresponding to a first processing transaction to be performed by the second computing device.

3. The system of claim 1, wherein applying data corresponding to the first request obtained from the first computing device to the first graph to determine the one or more first embeddings and the one or more second embeddings further comprising:

obtain, by the system at the first layer, the first request from the first computing device, and send, by the system, the one or more first embeddings and the one or more second embeddings to the second computing device,

wherein the one or more nodes of the first graph extracted from the global graph are based on user data in the first request.

4. The system of claim 3, wherein determining the global graph based on classifying the global data further comprising:

allocate, by the system at the first layer, nodes representative of the global data to respective embedding spaces in the global graph, classify, by the system at the first layer, the global data as the first data type or the second data type, and partition, by the system at the first layer, the nodes into a plurality of clusters based on classifying the global data as one of the first data type and the second data type, wherein the plurality of clusters comprising one or more first clusters representative of the first data type and one or more second clusters representative of the second data type.

5. The system of claim 4, wherein the one or more first embeddings corresponding to non-sensitive data associated with a user of the first computing device, and the one or more second embeddings corresponding to encrypted tokenized sensitive data associated with the user of the first computing device.

6. The system of claim 1, wherein the second request corresponding to a second processing transaction to be performed by the third computing device, wherein the second request comprising the one or more first embeddings and the one or more second embeddings of the first request.

7. The system of claim 1, wherein classifying the second request obtained from the second computing device as the first request type or the second request type based on applying data corresponding to the second request to the second graph further comprising:

obtain, by the system at the second layer, a source dataset comprising a plurality of requests from the third computing device, encode, by the system at the second layer, the source dataset into respective embedding spaces of the second graph, and partition, by the system at the second layer, the source dataset in the respective embedding spaces into respective clusters of the second graph, wherein the second request is classified as one of the first request type and the second request type based on encoding the data corresponding to the second request into one of the respective clusters in the second graph.

8. The system of claim 7, wherein classifying the second request obtained from the second computing device as the first request type or the second request type based on applying data corresponding to the second request to a second graph further comprising:

obtain, by the system at the second layer, a target dataset from a fourth computing device, encode, by the system at the second layer, the target dataset into respective embedding spaces of the second graph, and tune, by the system at the second layer, the second graph based on the encoded target dataset, wherein the tuning comprising concatenating vectors associated with respective embeddings of the source dataset with vectors associated with respective embeddings of the target dataset;

wherein the first request type is indicative of a fraudulent request and the second request type is indicative of a non-fraudulent request.

9. The system of claim 1, wherein predicting the authenticity of the call sequence obtained from the second computing device based on the sequence threshold further comprising:

obtain, by the system at the third layer, a reference dataset corresponding to corresponding to a plurality of other call sequences classified as a first call sequence type or a second call sequence type, determine, by the system at the third layer, based on the reference dataset, a first sequence matrix representative of the first call sequence type and a second sequence matrix representative of the second call sequence type, determine, by the system at the third layer, the sequence threshold based on the first sequence matrix and the second sequence matrix, and determine, by the system at the third layer, a third graph based on the first sequence matrix and a fourth graph based on the second sequence matrix, wherein the authenticity of the call sequence is determined based on applying the call sequence to the third graph and the fourth graph and based on the sequence threshold.

10. A method for performing threat monitoring at one or more network layers, the method comprising:

applying, at a first layer, data corresponding to a first request obtained from a first computing device to a first graph to determine one or more first embeddings and one or more second embeddings;

classifying, at a second layer, a second request obtained from a second computing device as a first request type or a second request type based on applying data corresponding to the second request to a second graph, wherein the classifying of the second request further comprising:

obtaining, at the second layer, a source dataset comprising a plurality of requests from a third computing device, encoding, at the second layer, the source dataset into respective embedding spaces of the second graph, and partitioning, at the second layer, the source dataset in the respective embedding spaces into respective clusters of the second graph, wherein the second request is classified as one of the first request type and the second request type based on encoding the data corresponding to the second request into one of the respective clusters in the second graph; and sending a call sequence to the third computing device as output based on authenticating the call sequence; and wherein the first request corresponds to one or more processing transactions to be performed by the second computing device;

wherein the one or more first embeddings corresponds to non-sensitive data of a user associated with the first computing device, and the one or more second embeddings corresponds to encrypted tokenized sensitive data of the user associated with the first computing device.

11. The method of claim 10, wherein classifying the second request obtained from the second computing device as the first request type or the second request type based on partitioning data corresponding to the second request to the second graph further comprising:

obtaining, at the second layer, a target dataset from a fourth computing device, encoding, at the second layer, the target dataset into respective embedding spaces of the second graph, and tuning, at the second layer, the second graph based on the encoded target dataset.

12. The method of claim 11, wherein the tuning comprising concatenating vectors associated with the respective embeddings of the source dataset with the vectors associated with the respective embeddings of the target dataset.

13. The method of claim 11, wherein the second request comprising data corresponding to one or more processing transactions to be performed by the third computing device and the fourth computing device based on the first request.

14. The method of claim 10, wherein the second request further comprising the one or more first embeddings and the one or more second embeddings.

15. A non-transitory computer readable media having stored thereon instructions executable by a processor to cause the processor to perform operations comprising:

obtain, at a first layer, a global data corresponding to user data from a plurality of first computing devices, the global data comprising a first data type and a second data type, determine, at the first layer, a global graph based on classifying the global data, extract, at the first layer, a first graph from the global graph based on a first request, the first graph comprising one or more nodes extracted from the global graph based on user data in the first request, apply, at the first layer, data corresponding to the first request obtained from a first computing device to the first graph to determine one or more first embeddings and one or more second embeddings, classify, at a second layer, a second request obtained from the second computing device as a fraudulent request or an authentic request based on applying data corresponding to the second request to a second graph, the second request being based on the one or more first embeddings and the one or more second embeddings, predict, at a third layer, an authenticity of a call sequence obtained from the second computing device based on a sequence threshold, and send, from the third layer, the call sequence to a third computing device as output based on authenticating the call sequence.

16. The non-transitory computer readable media of claim 15, wherein applying data corresponding to the first request obtained from the first computing device to the first graph to determine the one or more first embeddings and the one or more second embeddings further comprising:

obtain, at the first layer, data corresponding to the first request from the first computing device, and classify, at the first layer, the global data as one of the first data type and the second data type, wherein the first request corresponds to one or more processing transactions to be performed by the second computing device, and wherein the one or more first embeddings corresponds to non-sensitive data of a user associated with the first computing device, and the one or more second embeddings corresponds to encrypted sensitive data of the user associated with the first computing device, wherein the first graph comprises one or more clusters representative of the first data type and one or more other clusters representative of the second data type.

17. The non-transitory computer readable media of claim 15, wherein determining the global graph based on the classifying the global data further comprising:

determine, at the first layer, a plurality of first nodes in the global graph corresponding to non-sensitive data, and determine, at the first layer, a plurality of second nodes in the global graph corresponding to sensitive data, wherein the first graph comprises one or more nodes of the plurality of first nodes and one or more nodes of the plurality of second nodes extracted from the global graph based on the first request.

18. The non-transitory computer readable media of claim 15, wherein predicting the authenticity of the call sequence obtained from the second computing device based on the sequence threshold further comprising:

obtain, at the third layer, a reference dataset corresponding to corresponding to a plurality of other call sequences classified as a first call sequence type or a second call sequence type, determine, at the third layer, based on the reference dataset, a first sequence matrix representative of the first call sequence type and a second sequence matrix representative of the second call sequence type, determine, at the third layer, the sequence threshold based on the first sequence matrix and the second sequence matrix, and determine, at the third layer, a third graph based on the first sequence matrix and a fourth graph based on the second sequence matrix, wherein the authenticity of the call sequence is determined based on applying the call sequence to the third graph and the fourth graph and based on the sequence threshold.

\* \* \* \* \*